US011683543B2

(12) United States Patent
Loheide et al.

(10) Patent No.: US 11,683,543 B2
(45) Date of Patent: *Jun. 20, 2023

(54) PUBLISHING A DISPARATE LIVE MEDIA OUTPUT STREAM MANIFEST THAT INCLUDES ONE OR MORE MEDIA SEGMENTS CORRESPONDING TO KEY EVENTS

(71) Applicant: Turner Broadcasting System, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,788

(22) Filed: Jun. 2, 2022

(65) Prior Publication Data
US 2022/0295121 A1 Sep. 15, 2022

Related U.S. Application Data

(60) Continuation of application No. 16/895,439, filed on Jun. 8, 2020, now Pat. No. 11,477,499, which is a (Continued)

(51) Int. Cl.
*H04N 21/235* (2011.01)
*H04N 21/236* (2011.01)
(Continued)

(52) U.S. Cl.
CPC ......... *H04N 21/2353* (2013.01); *H04L 65/70* (2022.05); *H04N 21/2187* (2013.01); *H04N 21/23614* (2013.01)

(58) Field of Classification Search
CPC .......... H04N 21/2353; H04N 21/2187; H04N 21/23614; H04N 21/26616;
(Continued)

(56) References Cited

U.S. PATENT DOCUMENTS 6,701,355 B1 3/2004 Brandt et al.
8,099,757 B2 1/2012 Riedl et al.
(Continued)

FOREIGN PATENT DOCUMENTS

KR 101061952 B1 9/2011

OTHER PUBLICATIONS

Corrected Notice of Allowance for U.S. Appl. No. 15/396,468 dated Aug. 26, 2022.
(Continued)

*Primary Examiner* — Oschta I Montoya
(74) *Attorney, Agent, or Firm* — Chip Law Group

(57) ABSTRACT

A system is provided for publishing a disparate live media output stream manifest that includes one or more media segments corresponding to key events. A start and stop time is obtained for a pre-produced media asset from a live playout system synchronized to a reference clock. Based on a reference time of the reference clock and play events from the live playout system, a normalized event metadata is converted from a play time of pre-produced media asset metadata to the reference time. The play events exists for the pre-produced media asset as start and stop times per the pre-produced media asset support inclusion of non-programming content and restart of the pre-produced media asset during a playout. Start and end messages are transmitted for publishing the normalized event metadata each time the pre-produced media asset is started and stopped during the playout in a disparate live media output stream.

18 Claims, 5 Drawing Sheets

Related U.S. Application Data division of application No. 16/231,467, filed on Dec. 22, 2018, now Pat. No. 10,873,774.

(51) Int. Cl.
*H04N 21/2187* (2011.01)
*H04L 65/70* (2022.01)

(58) Field of Classification Search
CPC ......... H04N 21/26258; H04N 21/8549; H04N 21/8456; H04L 65/70; H04L 65/611; H04L 65/612; H04L 65/752; H04L 65/80
See application file for complete search history.

(56) References Cited

U.S. PATENT DOCUMENTS

| | | | |
|---|---|---|---|
| 8,132,203 B2 | 3/2012 | Heer | |
| 8,458,053 B1 | 6/2013 | Buron et al. | |
| 8,600,382 B2 | 12/2013 | Hicks, III | |
| 8,842,879 B2 | 9/2014 | Laksono et al. | |
| 8,954,521 B1 | 2/2015 | Faaborg et al. | |
| 9,380,264 B1 | 6/2016 | Vakalapudi | |
| 10,045,091 B1 | 8/2018 | Nijim et al. | |
| 2002/0112239 A1 | 8/2002 | Goldman | |
| 2004/0031056 A1 | 2/2004 | Wolff | |
| 2004/0163103 A1 | 8/2004 | Swix et al. | |
| 2005/0015816 A1* | 1/2005 | Christofalo | H04N 21/812 725/35 |
| 2005/0060745 A1 | 3/2005 | Riedl et al. | |
| 2005/0096978 A1 | 5/2005 | Black | |
| 2006/0064730 A1 | 3/2006 | Rael et al. | |
| 2006/0122916 A1 | 6/2006 | Kassan | |
| 2006/0287915 A1* | 12/2006 | Boulet | G06Q 30/0269 348/E7.071 |
| 2007/0101361 A1 | 5/2007 | Spielman et al. | |
| 2009/0070808 A1 | 3/2009 | Jacobs | |
| 2009/0187939 A1 | 7/2009 | LaJoie | |
| 2009/0285217 A1* | 11/2009 | Frink | H04N 21/23655 370/394 |
| 2009/0287790 A1 | 11/2009 | Upton et al. | |
| 2010/0010899 A1 | 1/2010 | Lambert et al. | |
| 2010/0125880 A1 | 5/2010 | Roewe | |
| 2010/0287297 A1 | 11/2010 | Lefebvre | |
| 2010/0293585 A1 | 11/2010 | Xia | |
| 2011/0052144 A1 | 3/2011 | Abbas et al. | |
| 2011/0123062 A1* | 5/2011 | Hilu | G06Q 30/02 382/100 |
| 2011/0177775 A1 | 7/2011 | Gupta et al. | |
| 2011/0209181 A1 | 8/2011 | Gupta et al. | |
| 2011/0246202 A1 | 10/2011 | McMillan et al. | |
| 2011/0302601 A1 | 12/2011 | Mayo et al. | |
| 2012/0030011 A1 | 2/2012 | Rey et al. | |
| 2012/0271942 A1 | 10/2012 | Walker et al. | |
| 2012/0272278 A1 | 10/2012 | Bedi | |
| 2013/0085851 A1 | 4/2013 | Pedro et al. | |
| 2013/0205212 A1* | 8/2013 | Sinha | H04N 21/432 715/719 |
| 2013/0263182 A1 | 10/2013 | Ivy et al. | |
| 2013/0276023 A1 | 10/2013 | Kent et al. | |
| 2014/0013354 A1 | 1/2014 | Johnson et al. | |
| 2014/0020017 A1 | 1/2014 | Stern et al. | |
| 2014/0071818 A1 | 3/2014 | Wang et al. | |
| 2014/0152894 A1 | 6/2014 | Childs et al. | |
| 2014/0189514 A1 | 7/2014 | Hilliard | |
| 2014/0270338 A1 | 9/2014 | Zhao et al. | |
| 2015/0106856 A1 | 4/2015 | Rankine | |
| 2015/0237386 A1 | 8/2015 | Sheehan et al. | |
| 2015/0256861 A1 | 9/2015 | Oyman | |
| 2015/0289022 A1 | 10/2015 | Gross | |
| 2015/0381936 A1 | 12/2015 | Goyal et al. | |
| 2016/0077710 A1 | 3/2016 | Lewis et al. | |
| 2016/0127788 A1 | 5/2016 | Roberts et al. | |
| 2016/0165306 A1 | 6/2016 | Nam | |
| 2016/0308958 A1 | 10/2016 | Navali et al. | |
| 2016/0345074 A1 | 11/2016 | Serbest et al. | |
| 2017/0055012 A1 | 2/2017 | Phillips et al. | |
| 2017/0055041 A1 | 2/2017 | Zhu | |
| 2017/0070789 A1 | 3/2017 | Liassides et al. | |
| 2017/0099506 A1 | 4/2017 | Grover | |
| 2017/0099511 A1 | 4/2017 | Grover | |
| 2017/0118537 A1 | 4/2017 | Stransky-Heilkron et al. | |
| 2017/0118538 A1 | 4/2017 | Ashbacher | |
| 2017/0195718 A1* | 7/2017 | Nair | H04L 67/568 |
| 2017/0289597 A1* | 10/2017 | Riedel | H04N 21/2183 |
| 2018/0007060 A1 | 1/2018 | Leblang et al. | |
| 2018/0165650 A1 | 6/2018 | Kashyape et al. | |
| 2018/0184047 A1 | 6/2018 | Simonsen et al. | |
| 2018/0285747 A1 | 10/2018 | Bron et al. | |
| 2018/0367823 A1 | 12/2018 | Brinkley et al. | |
| 2019/0068665 A1 | 2/2019 | Kieft et al. | |
| 2019/0364317 A1 | 11/2019 | Milford | |
| 2019/0380021 A1 | 12/2019 | Meek et al. | |
| 2020/0244778 A1 | 7/2020 | Berookhim et al. | |

OTHER PUBLICATIONS

Corrected Notice of Allowance for U.S. Appl. No. 15/396,468 dated Jun. 24, 2022.
Corrected Notice of Allowance for U.S. Appl. No. 17/016,789 dated Jun. 27, 2022.
Corrected Notice of Allowance for U.S. Appl. No. 17/017,052 dated Aug. 1, 2022.
Corrected Notice of Allowance for U.S. Appl. No. 17/017,052 dated Jun. 15, 2022.
Corrected Notice of Allowance for U.S. Appl. No. 17/017,145 dated Jul. 22, 2022.
Corrected Notice of Allowance for U.S. Appl. No. 17/017,241 dated Aug. 3, 2022.
Corrected Notice of Allowance for U.S. Appl. No. 17/094,102 dated Aug. 3, 2022.
Corrected Notice of Allowance for U.S. Appl. No. 17/094,102 dated Jun. 24, 2022.
Corrected Notice of Allowance for U.S. Appl. No. 17/094,319 dated Aug. 1, 2022.
Corrected Notice of Allowance for U.S. Appl. No. 17/094,319 dated Jun. 15, 2022.
Corrected Notice of Allowance for U.S. Appl. No. 17/147,887 dated Jul. 22, 2022.
Corrected Notice of Allowance for U.S. Appl. No. 17/340,166 dated Aug. 22, 2022.
Corrected Notice of Allowance for U.S. Appl. No. 17/340,166 dated Jul. 5, 2022.
Final Office Action for U.S. Appl. No. 16/854,970 dated Aug. 18, 2022.
Non-Final Office Action for U.S. Appl. No. 17/206,473 dated Jun. 22, 2022.
Non-Final Office Action for U.S. Appl. No. 17/326,281 dated Aug. 18, 2022.
Non-Final Office Action for U.S. Appl. No. 17/206,737 dated Jun. 23, 2022.
Non-Final Office Action for U.S. Appl. No. 17/527,817 dated Jun. 15, 2022.
Notice of Allowability for U.S. Appl. No. 16/092,893 dated Jun. 8, 2022.
Notice of Allowability for U.S. Appl. No. 16/895,439 dated Jul. 20, 2022.
Notice of Allowability for U.S. Appl. No. 16/895,439 dated Jun. 8, 2022.
Notice of Allowability for U.S. Appl. No. 16/902,893 dated Jul. 20, 2022.
Notice of Allowance for U.S. Appl. No. 17/017,241 dated Jul. 15, 2022.
Notice of Allowance for U.S. Appl. No. 17/340,677 dated Aug. 8, 2022.
Corrected Notice of Allowance for U.S. Appl. No. 15/396,468 dated Oct. 17, 2022.
Corrected Notice of Allowance for U.S. Appl. No. 16/895,439 dated Sep. 14, 2022.

(56) References Cited

OTHER PUBLICATIONS

Corrected Notice of Allowance for U.S. Appl. No. 16/902,893 dated Sep. 19, 2022.
Corrected Notice of Allowance for U.S. Appl. No. 17/017,145 dated Sep. 15, 2022.
Corrected Notice of Allowance for U.S. Appl. No. 17/017,241 dated Oct. 20, 2022.
Corrected Notice of Allowance for U.S. Appl. No. 17/094,319 dated Sep. 23, 2022.
Corrected Notice of Allowance for U.S. Appl. No. 17/147,887 dated Oct. 11, 2022.
Corrected Notice of Allowance for U.S. Appl. No. 17/340,166 dated Sep. 23, 2022.
Corrected Notice of Allowance for U.S. Appl. No. 17/340,677 dated Nov. 14, 2022.
Corrected Notice of Allowance for U.S. Appl. No. 17/340,677 dated Oct. 21, 2022.
Final Office Action for U.S. Appl. No. 16/918,085 dated Oct. 24, 2022.
Final Office Action for U.S. Appl. No. 17/206,473 dated Sep. 8, 2022.
Non-Final Office Action for U.S. Appl. No. 15/988,572 dated Oct. 6, 2022.
Non-Final Office Action for U.S. Appl. No. 17/016,789 dated Sep. 22, 2022.
Non-Final Office Action for U.S. Appl. No. 17/340,538 dated Oct. 3, 2022.
Non-Final Office Action for U.S. Appl. No. 17/408,680 dated Sep. 15, 2022.
Non-Final Office Action for U.S. Appl. No. 17/453,628 dated Sep. 27, 2022.
Non-Final Office Action for U.S. Appl. No. 17/830,587 dated Nov. 25, 2022.
Notice of Allowance for U.S. Appl. No. 16/854,970 dated Oct. 13, 2022.
Notice of Allowance for U.S. Appl. No. 17/306,758 dated Sep. 16, 2022.
Notice of Allowance for U.S. Appl. No. 17/527,817 dated Oct. 3, 2022.
Notice of Allowance for U.S. Appl. No. 17/688,666 dated Sep. 20, 2022.
Notice of Allowance for U.S. Appl. No. 17/839,649 dated Oct. 19, 2022.
Notice of Allowance for U.S. Appl. No. 17/839,882 dated Oct. 26, 2022.
Notice of Allowance for U.S. Appl. No. 17/858,698 dated Oct. 4, 2022.
Notice of Allowance for U.S. Appl. No. 17/453,628 dated Mar. 2, 2023.
Final Office Action for U.S. Appl. No. 17/206,737 dated Jan. 5, 2023.
Final Office Action for U.S. Appl. No. 17/408,680 dated Jan. 12, 2023.
Final Office Action for U.S. Appl. No. 17/408,739 dated Jan. 12, 2023.
Non-Final Office Action for U.S. Appl. No. 17/206,473 dated Dec. 22, 2022.
Non-Final Office Action for U.S. Appl. No. 17/366,738 dated Dec. 9, 2022.
Non-Final Office Action for U.S. Appl. No. 17/708,241 dated Dec. 20, 2022.
Notice of Allowability for U.S. Appl. No. 16/918,085 dated Mar. 1, 2023.
Notice of Allowability for U.S. Appl. No. 17/839,649 dated Jan. 25, 2023.
Notice of Allowance for U.S. Appl. No. 17/731,049 dated Mar. 2, 2023.
Notice of Allowance for U.S. Appl. No. 16/918,085 dated Jan. 13, 2023.
Notice of Allowance for U.S. Appl. No. 17/326,281 dated Dec. 7, 2022.
Notice of Allowance for U.S. Appl. No. 17/340,538 dated Jan. 23, 2023.
Advisory Action for U.S. Appl. No. 17/408,680 dated Mar. 28, 2023.
Advisory Action for U.S. Appl. No. 17/408,739 dated Mar. 28, 2023.
Final Office Action for U.S. Appl. No. 15/988,572 dated Apr. 11, 2023.
Non-Final Office Action for U.S. Appl. No. 17/739,985 dated Mar. 30, 2023.
Non-Final Office Action for U.S. Appl. No. 17/742,468 dated Mar. 30. 2023.
Notice of Allowance for U.S. Appl. No. 17/708,241 dated Apr. 5, 2023.
Notice of Allowance for U.S. Appl. No. 17/206,473 dated Mar. 30, 2023.
Notice of Allowance for U.S. Appl. No. 17/986,403 dated Apr. 7, 2023.
Notice of Allowance for U.S. Appl. No. 17/830,587 dated Mar. 9, 2023.

\* cited by examiner

PUBLISHING A DISPARATE LIVE MEDIA OUTPUT STREAM MANIFEST THAT INCLUDES ONE OR MORE MEDIA SEGMENTS CORRESPONDING TO KEY EVENTS

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 16/895,439, filed on Jun. 8, 2020, which is further a Divisional Application of U.S. Pat. No. 10,873,774, issued on Dec. 22, 2020.

This application also makes reference to:
U.S. Pat. No. 10,992,973, issued on Apr. 27, 2021;
U.S. Pat. No. 10,924,804 issued on Feb. 16, 2021; and
U.S. Pat. No. 10,856,016, issued on Dec. 1, 2020.

Each of the above-referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing a disparate live media output stream manifest that includes one or more media segments corresponding to key events.

BACKGROUND

Advancements in the field of television content packaging and distribution systems have led to a massive development of numerous technologies and broadcasting platforms that are revolutionizing the way consumer devices access and playout media content. Usually, broadcasting platforms refer to the types of networks that are used to deliver the media content to the consumers. Currently, the broadcasting platforms, such as analog terrestrial broadcast, digital terrestrial broadcast, direct-to-home satellite broadcast, cable, Internet Protocol (IP), and over-the-top television (OTT), compete and strive to increase their appeal by gaining and retaining the audience viewing the media content.

Modern web streaming protocols that support Dynamic Adaptive Streaming over HTTP, such as HTTP Live Streaming (HLS) and Dynamic Adaptive Streaming over HTTP (DASH), are implemented to support streaming of live content services, such as DIRECTV NOW[SM], SLING TV[SM] and PLAYSTATION™ VUE, to consumer devices. Traditional service providers, such as COMCAST[SM], also have set-top boxes capable of receiving both legacy broadcast distribution protocols, as well as modern web streaming protocols. However, such traditional service providers are constrained by the number of broadcast channels they can support on the legacy infrastructure and are more likely to allow more niche-based programming using Internet-based distribution.

Technically, such modern web streaming protocols break media content into numerous small segments typically less than 10 seconds in length. These protocols further implement a text-based file often referred to as a manifest that instructs the player what media segment to retrieve and play next. A Video-on-Demand asset, prepared for web distribution, has a sequence of short duration segments (these can be separate physical files or pointers (real or to be calculated) to the short media segments inside a larger file) as well as a manifest that lists all the video segments (or instructions for the player to be able to determine all the video segments) that make up the full length of the media asset.

Delivery of live content is also supported by these modern streaming protocols. In this case, new short content media segments are made available as soon as they are created. In some protocols, each new segment is added to the manifest while in others the player is provided the necessary information to calculate the next live segment. In the latter case, a signal in the media content itself is used to inform the player when the player needs to re-inspect the manifest for a change in content (media or other). The manifest file and/or content media segment can also include additional information to help the player transition smoothly between media content from different sources. This is used for creating a playlist of multiple media content files, or for interrupting media content with other content such as advertisements and then resuming the media content.

In traditional television distribution systems, a consumer joining a program in progress simply misses the beginning of the program. In today's television distribution, a consumer might have an option to use a DVR to record the program from the beginning. However, this recording option is available only if a DVR recording is pre-scheduled ahead of time. In the event, when such recording is not pre-scheduled, the state of the art does not provide any teaching to allow a user to catch-up with a program already in progress. Therefore, a system to generate an event manifest allowing a consumer to restart an in-progress program may be required, and quickly catch-up to the live point by viewing only the key events or highlights from earlier part of the live event.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing a disparate live media output stream manifest that includes one or more media segments corresponding to key events, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
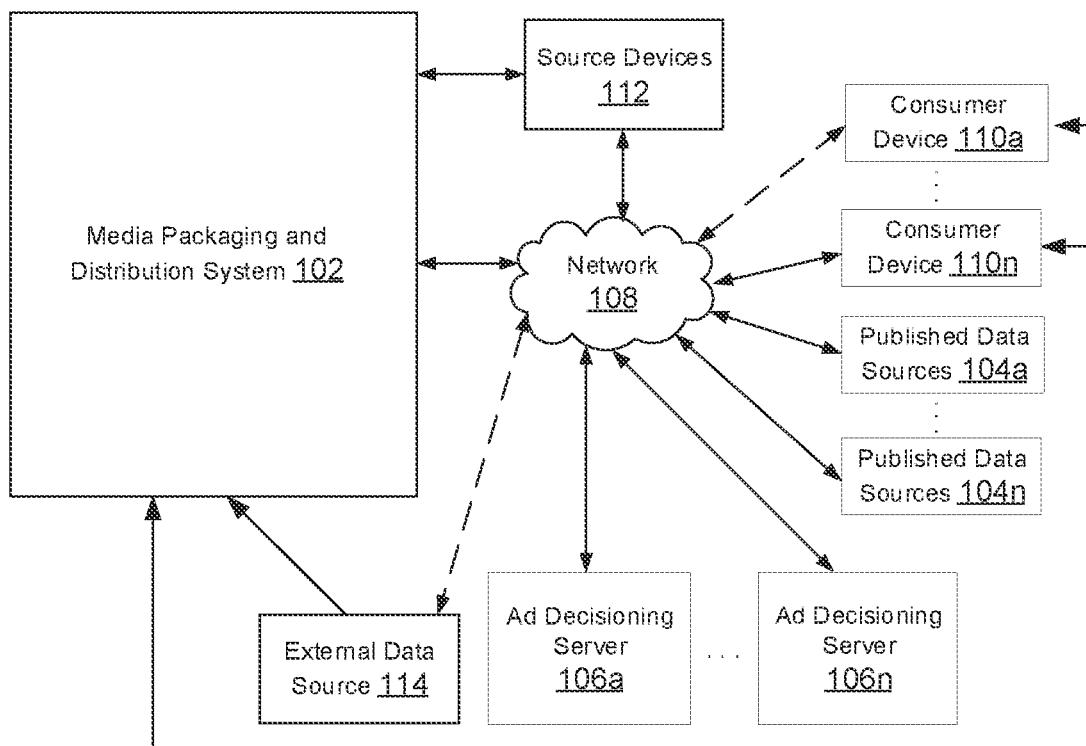
FIG. 1A is a block diagram that illustrates an exemplary system for publishing a disparate live media output stream manifest that includes one or more media segments corresponding to key events, in accordance with an exemplary embodiment of the disclosure.

Certain embodiments of the disclosure may be found in a method and system for publishing a disparate live media output stream manifest that includes one or more media segments corresponding to key events. Various embodiments of the disclosure provide a method and system that not only provide live channel offerings in a cost-effective manner but also provide enhanced, intelligent, and personalized viewer experience to increase their appeal by retaining the audience viewing the media content.

Modern streaming protocols, such as HLS and DASH, break media content into numerous small media segments, typically less than 10 seconds in length. Further, the modern streaming protocols implement manifests that instruct a media player on what media segment to retrieve and play next. The manifest may enlist the media segments that make up the full length of the media asset. The manifest may include information, based on which the media player at a consumer device may be able to determine the media segments. The manifest and/or media segment may also include and/or specify additional information to allow a media player to transition smoothly between media content streams from different sources. The manifest may be used for creating a playlist of multiple media content files, or for interrupting media content with advertising and then resuming the media content.

Such modern streaming protocols support video-on-demand (VOD) assets and live content as well. The VOD assets prepared for distribution, for example, Internet distribution, may have a sequence of short duration segments added to a manifest. The short duration segments may be separate physical files or pointers (real or to be calculated) to the short media segments inside a larger file. On the other hand, in the case of live content, new short content media segments are made available as soon as they are created. In some protocols, each new segment is added to a manifest while in others the media player is provided with information that may be utilized to calculate what the next live segment will be. In the latter case, a signal in the media content itself is used to inform the player when to re-inspect or check the manifest for a change in media content. In live streaming, delivery of live content is supported by making available each new short media segments as soon as such media segments are generated. In some protocols, new media segments may be added to the manifest, while in others, the media player calculates necessary information about the next live media segments.

In accordance with various embodiments of the disclosure, a system is provided for publishing a disparate live media output stream manifest that includes one or more media segments corresponding to key events. In an embodiment, one or more processors in the system may be configured to generate a programming schedule that includes one or more key events which occurred from a starting point until a current live point in a live input stream. In accordance with an embodiment, the programming schedule may be generated based on a synchronization of one or more disparate sub-systems in the system and a reference/master clock may provide a reference time to synchronize the one or more disparate sub-systems. Further, the one or more processors may be configured to insert the current live point and at least one or more media segments corresponding to the one or more key events that occurred prior to the current live point included in a live input stream manifest into disparate live media output stream manifests based on the programming schedule and publish the disparate live media output stream manifests based on the insertion.

In another embodiment, one or more processors of the system may be configured to convert normalized event metadata created for pre-produced media assets based on content asset play time to a reference time provided by a reference/master clock. In accordance with an embodiment, creation of the normalized event metadata is ahead of time independent of live event logging system. The one or more processors of the system may further be configured to playout the pre-produced media assets in a disparate live media output stream and present one or more key events to one or more consumer devices before joining the live media output stream with the pre-produced media asset in progress. Further, the one or more processors may be configured to present additional information to the consumer device when an associated user views the pre-produced media assets contained in the live media output stream.

Figure 1B:
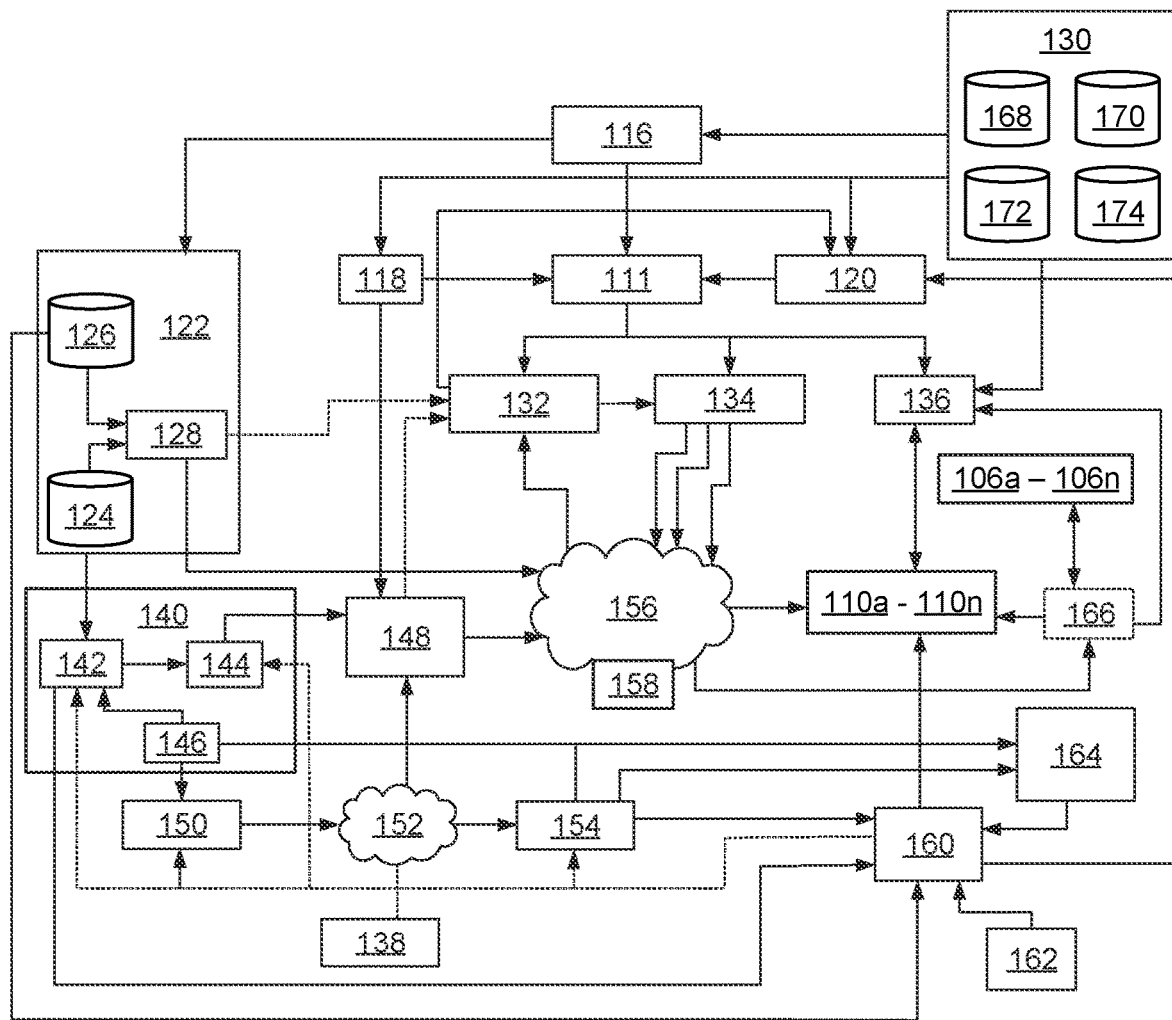
FIG. 1B is a block diagram that illustrates an exemplary media packaging and distribution system for publishing a disparate live media output stream manifest that includes one or more media segments corresponding to key events, in accordance with another exemplary embodiment of the disclosure.

FIGS. 1A and 1B are block diagrams that illustrate an exemplary system for publishing a disparate live media output stream manifest that includes one or more media segments corresponding to key events, in accordance with an exemplary embodiment of the disclosure. Referring to FIG. 1A, a system 100 comprises a media packaging and distribution system 102 that is communicatively coupled to published data sources 104a, . . . , 104n, Ad decisioning servers 106a, . . . , 106n, via a network 108 and/or other programmatic means. There are shown consumer devices 110a . . . 110n that are communicatively coupled to the network 108. There are also shown source devices 112 communicatively coupled to the media packaging and distribution system 102 through the network 108. An external data source 114 is also provided, which is communicatively coupled to the media packaging and distribution system 102 through the network 108.

The media packaging and distribution system 102 may comprise suitable logic, circuitry, and interfaces that may be configured to execute code that handles media content comprising audio, video, images, metadata, manifests, and/ or other data (embedded and/or externally referenced). The media content may include a video, an audio, a combination of audio and video presentations, and/or embedded or externally referenced metadata, a combination of multiple-audio, multiple-video, and/or embedded or externally referenced metadata. Accordingly, in accordance with an embodiment, the media packaging and distribution system 102 publishes a disparate per-client live media output stream based on dynamic insertion of targeted non-programming content and customized programming content.

In this regard, the media packaging and distribution system 102 may provide video programming services to viewers, usually for a subscription fee (such as pay television). The media packaging and distribution system 102 also handles distribution, for example, multicasting, unicasting, broadcasting, streaming, for one or more channels to be viewed on one or more of the consumer devices 110a, . . . , 110n.

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a redistributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably.

The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In this regard, the broadcast provider may be configured to execute code that communicates linear video feeds (also referred to as a network television feed or broadcast feed) to the media packaging and distribution system 102. In a broadcast chain, the broadcast provider may receive actual content, for example, from a production studio, in a serial digital interface (SDI) video interface and/or on a high-definition SDI (HD-SDI) video interface, process the content, such as insertion of graphics, closed captions, preparation of programming schedule, insertion of triggers, and the like, and final delivery by a broadcasting apparatus. The linear video feed may be broadcasted as a multi-program transport stream (MPTS) (also referred to as a live video feed) to the media packaging and distribution system 102, via the network 108. The MPTS may be distributed over traditional means as the MPTS may receive the programming schedule 111 and be made aware of blackouts, show overruns or last minute show replacements only. Thus, a corresponding VOD2Live channel may be created to provide the various consumer devices with alternative viewing options. The broadcast provider may be owned by (or associated with) a broadcast provider or operator, a network provider or operator, or a content provider or operator.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain events or operations, such as, for example, when to blackout shows. Examples of the media packaging and distribution system 102 may include direct-broadcast satellite (DBS) providers, cable television (CATV) systems, and other wireline video providers and competitive local exchange carriers (CLECs) using, for example, IPTV.

Each of the plurality of published data sources 104a, . . . , 104n may be coupled to one or more television networks and may comprise suitable logic, circuitry, and interfaces that may be configured to execute code that provides actual audiences for programs that were distributed. As illustrated in FIG. 1A, the plurality of published data sources 104a, . . . , 104n are coupled to the media packaging and distribution system 102 via the network 108 and configured to monitor audience drift to or away from a tuned channel airing a live media output stream. The plurality of published data sources 104a . . . 104n may provide actual audiences for programs to an indexing and storage system. An exemplary published data source may be Nielsen. Another exemplary published data source may be a published database that provides ratings for a media item, such as gross rating point (GRP). The GRP is an advertising or promotion impact measure for each advertising and/or promotional campaigns, known in the art. Other exemplary published data sources may also include direct/indirect access to other public or private data sources (persistent or ephemeral) through programmatic means.

The Ad decisioning servers 106a, . . . , 106n may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of the live input streams based on the detected upcoming indicator, such as an inbound trigger, a signaling point, and/or a signal in a pre-encoded media asset and/or a live input stream by the Ad decisioning servers 106a, . . . , 106n. The Ad decisioning servers 106a, . . . , 106n may receive a request for retrieval of non-programming content, for example, ads, from a non-programming content proxy server 166 (not shown). Specifically, the Ad decisioning servers 106a, . . . , 106n may receive the request from one or more of the consumer devices 110a, . . . , 110n, via the non-programming content proxy server 166 (FIG. 1B). The request may be received when one or more indicators and/or pre-encoded placeholder content segment for a scheduled duration of one or more non-programming content breaks. The scheduled duration of one or more non-programming content breaks may be defined by a received programming schedule and are encountered in the disparate live media output stream manifest during media content playout by media players at the one or more of the consumer devices 110a, . . . , 110n. In accordance with an embodiment, the Ad decisioning servers 106a, . . . , 106n may be configured to determine which ads to serve (may include overlay graphics and/or presentation information) to consumer devices 110a, . . . , 110n based on stream ID, Program ID, Geo Location, Time, and any preferences associated with an individual consumer device or ad ID.

The network 108 may be any kind of network or a combination of various networks, and it is shown illustrating the communication that may occur between the Ad decisioning servers 106a, . . . , 106n and the media packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite.

Thus, for requests received from the consumer devices 110a, . . . , 110n, based on corresponding disparate live media output stream manifests, the Ad decisioning servers 106a, . . . , 106n may identify the opportunities for the real-time nonprogramming content or advertisement placement activity. In this regard, as the advertisement decisioning component of the Ad decisioning servers 106a, . . . , 106n is implemented in a consumer device, such as one or more of the consumer devices 110a, . . . , 110n, the Ad decisioning servers 106a, . . . , 106n may identify real-time content or advertisement placement opportunity for dynamic ad insertion. For example, commercial or non-commercial advertisements may be dynamically inserted by the Ad decisioning servers 106a, . . . , 106n within program segments of a media feed based on the indicator detected by the media player or a proxy server. The detected indicator may be, for example, upcoming inbound trigger, signaling point, and/or signal, in the disparate live media output stream manifest. In various embodiments, the advertisement decisioning component of the Ad decisioning servers 106a, . . . , 106n may be configured to determine which advertisements, graphical treatment graphics, and presentation information to serve to the consumer devices 110a, . . . , 110n based on stream ID, a program ID, a geographical location, time, and any preferences associated with an individual consumer or an advertisement ID specified by the disparate live media output stream manifest.

The consumer devices 110a, . . . , 110n may refer to end-user devices or consumption devices where the content is played to be consumed by a user. The number of impressions of a media item, such as an advertisement and/or promotional media, on such consumer devices 110a, . . . , 110n determines the advertising impact or promotion impact and number of actual audiences achieved during campaigns. Examples of the consumer devices 110a, . . . , 110n may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The consumer devices 110a, . . . , 110n may further include process/system that may process the output for any means, regardless of the capability or intent to decode for media presentation, and on which the consumer may launch a web page, a web application, or a web service to view media content.

The source devices 112 may comprise suitable logic, circuitry, and interfaces that may be configured to communicate a live media feed or live input streams of a channel, such as an existing channel, to the media packaging and distribution system 102. In accordance with an embodiment, the live input streams of the channel may correspond to a broadcast feed. The source device 112 may be communicatively coupled to the network 108.

The external data sources 114 may comprise suitable logic, circuitry, and interfaces that may be configured to execute code that handles retrieval and storage of audience data that corresponds to subscribers of the consumer devices 110a, . . . , 110n. The audience data may include demographic data, audience targeting data, trending data, device type data, device platform data, and content recognition-based data, such as automatic content recognition (ACR)-based data. The trending data comprises information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

Referring now to FIG. 1B, there is shown an exemplary media packaging and distribution system 102 for publishing a disparate live media output stream manifest that includes one or more media segments corresponding to key events. As illustrated in FIG. 1B the media packaging and distribution system 102 may comprise On-Demand manager 116, a live event manager 118, a content decisioning system 120, a content processing system 122 (comprising a media content metadata storage system 124, a media content master storage system 126, and a content encoder/packager 128), schedules, rights, and preferences database 130, an indexing and storage system 132, a stream publishing engine 134, a stream selection service 136, a reference clock 138, a live production and playout system 140 (comprising a live playout 142, a clock inserter 144, and a live production 146), a live stream encoder/packager 148, a live event encoder 150, a backhaul network 152, a live event logging system 154, a content delivery system 156, a media storage 158, a normalized event metadata 160, other data sources 162, an event timing system 164, and a proxy server 166. The schedules, rights, and preferences database 130 may further comprise content rights repository 168, an event schedule repository 170, owner preferences repository 172, and user preferences repository 174.

The On-Demand manager 116 may comprise suitable logic, circuitry, and interfaces that may be configured to control the encoding and packaging of files for consumption as On-Demand or pre-encoded media assets. The On-Demand manager 116 may further create a schedule for the indexing and storage system 132 and stream publishing engine 134 to create disparate versions if desired to be produced.

The live event manager 118 may comprise suitable logic, circuitry, and interfaces that may be configured to analyze the live event schedules and rights, and schedule resources to stream such live events to the correct publishing points. The live event manager 118 may further generate a schedule for the indexing and storage system 132 and stream publishing engine 134, if event start over and catch-up variations are desired to be produced.

The content decisioning system 120 may comprise suitable logic, circuitry, and interfaces that may be configured to determine what media to include in a disparate live media output stream manifest based on one or more of individual user preferences, content rights, and/or content owner preferences retrieved from the schedules, rights, and preferences database 130.

The content processing system 122 may comprise suitable logic, circuitry, and interfaces that may be configured to determine if the scheduled On-Demand or pre-encoded media asset is already available and has been processed to the correct format for further distribution.

The media content metadata storage system 124 may comprise suitable logic, circuitry, and interfaces that may be configured to store media content metadata. The media content metadata may include metadata associated with media segments stored in the media content master storage system 126. Examples of the media content metadata may include a media content identifier, a title of the media content, type of the media content (such as movie series (season episode number)), genre, plot summary, duration, advertisement break locations, credit locations, scene descriptions, a short summary of the media segments, a short summary of ideal advertisement placements within the content, a file format, digital right management (DRM), encryption information, length of the media content, a date and/or time the media content was added to the catalog of media content, a new item indicator for the media content (e.g., a new media asset that became available within the last 24 hours, last few days, last week, and/or the like), a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the media content metadata storage system 124 may also store program-specific information (PSI) data as defined by ISO/IEC 13818-1 (MPEG-2), closed captioning data, and subtitles associated with the media segments stored in the media content master storage system 126. Other forms of metadata may be utilized without departing from the spirit and scope of the various embodiments of the disclosure.

The media content master storage system 126 may comprise suitable logic, circuitry, and interfaces that may be configured to store master versions of the media content. In accordance with an embodiment, such master versions of the media content may be used as sources for creating On-Demand or pre-encoded media assets for consumer devices 110a, . . . , 110n in the required formats.

The content encoder/packager 128 may comprise suitable logic, circuitry, and interfaces to encode and package media content into the required On-Demand formats for delivery to consumer devices 110a . . . 110n. The media content may correspond to one or more of the plurality of media segments transcoded to different types of streams for different types of devices, such as a TV or a mobile device, and marked with Nielson markers. Based on such a package, a corresponding media content distribution device may dynamically generate one or more encoded media content assets for playout to one or more players communicatively coupled through the content delivery system 156.

The content encoder/packager 128 may be configured to publish the one or more encoded content assets in real-time or near real-time. The content encoder/packager 128 may be operable to create "C3" content assets and clips that may be made available before content roles out of the media content packaging and distribution system 102. The content encoder/packager 128 may also be configured to provide near-real time redundancy. The resulting converted output, i.e. one or more encoded content assets, that is generated by the content encoder/packager 128 may be communicated to the indexing and storage system 132 which may be communicatively coupled with the consumer devices 110a, . . . , 110n. The content encoder/packager 128 may also support a robust interface (e.g. application data interface (ADI)) that defines the On-Demand duration of the individual segments as well as encryption requirements and a service type to link for ad insertion. In accordance with an embodiment, the content encoder/packager 128 may publish media content to the media storage 158 on the content delivery system 156.

The schedules, rights, and preferences database 130 may comprise suitable logic, circuitry, and interfaces that may be configured to store the schedules for all source feeds, availability rights for all the content in the schedules, regional blackout zones for the various sports leagues, predefined location-based viewing preferences, individual client viewing preferences, and any viewing or transition rules provided by the stream owner operator.

The repository of schedules, rights, and preferences database 130 may comprise suitable logic, circuitry, and interfaces that may be configured to execute code to store content rights, user preferences, regional preferences, live schedules, and regional rights. For example, content rights may store availability and platform rights for live input streams in the first programming schedules, such as the first programming schedule 111 111, the user preferences may store preferences of individual user viewing preferences, the regional preferences may store regional viewing preferences, the live schedules may store the schedules for live input streams, and the regional rights may store regional blackout zones for the various sports leagues, for example. The repository of schedules, rights, and preferences database 130 may further store data supplied from a stream owner/operator including requirements, preferences, such as predefined location-based viewing preferences, stream transition rules, and any required client data, such as service level and zip code.

The indexing and storage system 132 may comprise suitable logic, circuitry, and interfaces that may be configured to ingest the manifest of the On-Demand source files, and continuously ingests the manifest of the live source streams. Further, the indexing and storage system 132 may comprise suitable logic, circuitry, and interfaces that may be configured to index the content segments listed, index the tags marking program boundaries, ad break locations, overlay opportunities credits, DRM systems supported, and the like.

The stream publishing engine 134 may comprise suitable logic, circuitry, and interfaces that may be configured to generate disparate live media output stream manifests. Such disparate live media output stream manifests may correspond to unique streaming manifests leveraging different indexes created by the indexing and storage system 132 from various On-Demand or pre-encoded media assets and live input streams, based on a defined schedule.

The stream selection service 136 may comprise suitable logic, circuitry, and interfaces that may be configured to provide a consumer device, for example, the consumer device 110a, requesting to view a correct variant of disparate live media output stream, based on the geolocation and identification of the consumer device 110a, along with data retrieved from the schedules, rights, and preferences database 130.

In accordance with an embodiment, the stream selection service 136 may communicate a notification of a recommended media item to a consumer device, for example, the consumer device 110a. The notification may be communicated to seek a confirmation from a user associated with the consumer device 110a, to display the recommended disparate live media output stream on the consumer device 110a. The stream selection service 136 may further receive an input that corresponds to the confirmation from the user associated with the consumer device 110a to display the recommended disparate live media output stream on the consumer device 110a, and further communicate the received input to update the schedule and inform the indexing and storage system 132 and the stream publishing engine 134. The stream selection service 136 may be further configured to receive user-preferences from the consumer devices 110a, . . . , 110n. In accordance with an embodiment, the stream selection service 136 may be configured to receive an input that corresponds to user-selections on the consumer devices 110a, . . . , 110n over the network 108. Thus, the stream selection service 136 may provide the consumer devices 110a, . . . , 110n requesting to view respective disparate live media output stream with the correct stream variant(s) based on the geolocation and identification of the users 134a and 134n, along with the programming schedules, content rights, and user preferences information.

The reference clock 138 may comprise suitable logic, circuitry, and interfaces which may be configured to synchronize disparate sub-systems or workflows to a common time base.

The live production and playout system 140 may comprise suitable logic, circuitry, and interfaces which may be configured to provide an infrastructure to produce live events and playback pre-produced media assets into a live service.

The live playout 142 may comprise suitable logic, circuitry, and interfaces which may be configured to provide an infrastructure to playback pre-produced media assets into a live service. The live playout 142 may playback pre-produced ads into a live event or playback pre-recorded media assets into a 24/7 channel when there are no live events.

The clock inserter 144 may comprise suitable logic, circuitry, and interfaces which may be configured to insert the master clock time reference into a disparate live media output stream. It may be a separate device or software within the live production and playout system 140.

The live production 146 may comprise suitable logic, circuitry, and interfaces which may be configured to provide an infrastructure that may be used to produce live events including switching between multiple cameras or audio sources, inserting graphics on the screen, and the like.

The live stream encoder/packager 148 may comprise suitable logic, circuitry, and interfaces that may be configured to encode and package live input streams for distribution, such as Internet or web distribution. The live stream encoder/packager 148 may further publish such live input streams to the content delivery system 156 for delivery to various consumer devices 110a, . . . , 110n.

The live event encoder 150 may comprise suitable logic, circuitry, and interfaces that may be configured to encode video and audio feeds from a live event location so the signals may be transmitted to other locations for further processing.

The live event encoder 150 may comprise suitable logic, circuitry, and interfaces that may be configured to encode video and audio feed from an event location so the signals can be transported to other locations for further processing.

The backhaul network 152 may comprise suitable logic, circuitry, and interfaces which may be configured to transport video and audio feeds from a live event location to a central location for additional processing before the final distribution of the live event. Additional processing may include at least ads, closed captioning, branding, and/or the like.

The live event logging system 154 may comprise suitable logic, circuitry, and interfaces which may be configured to create metadata around a live event, such as the timing of a key event. For example, in a sports event, each play may be logged and then may be used to support player statistics.

The content delivery system 156 may comprise suitable logic, circuitry, interfaces and networks that may be configured for distributing media content to the consumer devices 110a, . . . , 110n. Generally, the term "content," "metadata," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The content delivery system 156 may be configured to provide a plurality of disparate live media output streams to the consumer devices 110a, . . . , 110n, via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The media storage 158 may comprise suitable logic, circuitry, and interfaces which may be configured to store encoded and packaged media assets, pre-encoded media asset manifests, live input streams, and live input stream manifests for distribution.

The normalized event metadata 160 may comprise suitable logic, circuitry, and interfaces that may be configured to combine events logged in real time with additional data supplying detailed event timing and additional data related to the logged event (including 3rd party media) into a standardized format. The normalized event metadata 160 may further perform the combination using the content metadata for pre-produced assets while also converting the time base to the reference clock 138 when the content is played live.

The other data sources 162 may correspond to data sources comprising additional metadata related to a logged event including image libraries, player statistics, biographies, related articles or video, and the like.

The event timing system 164 may comprise suitable logic, circuitry, and interfaces which may be configured to provide accurate start and end times around one or more key events in a live input stream. In some cases, where the live event logging system 154 may only provide a single time stamp for an event, and additional detail is required to extract highlights, the event timing system 164 may be utilized to provide accurate details.

The proxy server 166 may comprise suitable logic, circuitry, and interfaces which may be configured to execute code to communicate with the consumer devices 110a, . . . , 110n. In accordance with an embodiment, the proxy server 166 may receive requests from the consumer devices 110a, . . . , 110n when the consumer devices 110a, . . . , 110n generate requests for an Ad decisioning server, such as the Ad decisioning server 106a, whenever the consumer devices 110a, . . . , 110n encounter an advertisement break tag or an overlay tag. In other words, the consumer devices 110a, . . . , 110n may call the proxy server 166 to initiate the media stream. At stream set-up, any ad ID and information from the consumer devices 110a, . . . , 110n is passed to the proxy server 166. The proxy server 166 receives the disparate live media output stream manifest from the content delivery system 156 and decodes the indicators for non-programing content. The proxy server 166 then calls the Ad decisioning server 106*a* and replaces the non-programing content media segments in the disparate live media output stream manifest and then delivers the disparate live media output stream manifest to the consumer devices 110*a*, . . . , 110*n* along with any data about the ads. In an embodiment, the proxy server 166 may be used for one or more consumer devices of the consumer devices 110*a*, . . . , 110*n* where the media player is fully controlled by a third party and does not support ad insertion. In such embodiment, ad blocking may be reduced which usually targets communication between the consumer devices 110*a*, . . . , 110*n* and the Ad decisioning server 106*a*. Further, the proxy server 166 may replace pre-encoded placeholder content segments, for example slate content segments, with the advertisement content segments received from the Ad decisioning server 106*a*.

The content rights repository 168 may comprise a set of rules governing when and how media content may be used. For example, when the media content can be made available On-Demand or as a pre-encoded media asset, if the media content can be made available over the Internet, whether the media content can be used in a live input stream and the timeframe, is the user allowed to restart the media content when live streamed, and/or can a consolidated manifest be created.

The event schedule repository 170 may comprise a schedule of plurality of key events. The event schedule repository 170 may be accessed by the live event manager 118 to configure the live stream encoder/packager 148.

The owner preferences repository 172 may include parameters regarding the desire to support catch-up versions of the media content, consolidated versions of the media content, the duration of the versions, and/or the scale rankings to be included, in the catch-up and consolidated manifests.

The user preferences repository 174 may include an index of previous media content selections of a user for both live and On-Demand or pre-encoded media asset that may be used to personalize and organize the user experience going forward.

The following paragraphs will discuss, in specific detail, the operation of components of the system as illustrated in FIGS. 1A and 1B. It may be noted that these paragraphs are illustrative and are incorporated only to aid the understanding of a skilled person and should not be considered as limiting the scope of the present disclosure.

In order to achieve the object(s) of the present disclosure, a plurality of disparate workflows may be synchronized. In accordance with an embodiment, the system 100 as disclosed herein, synchronizes disparate sub-systems (or workflows). In an embodiment, to synchronize the disparate sub-systems (or workflows), the live production and playout system 140 may be synchronized to the reference clock 138. In accordance with an embodiment, the synchronization may be performed by the live event encoder 150 that embeds the reference clock 138 prior to backhaul of a live event in a live input stream. In accordance with another embodiment, the clock inserter 144 in the live production and playout system 140 may be configured to perform the synchronization if there is no need to backhaul the live event to another location for further processing. The reference clock 138 may be embedded as a linear time code, or as a picture timing data in the encoded media content, such as a video feed. Such time may be embedded as SCTE Time Descriptor metadata.

In accordance with an embodiment, an encoded live input stream generated by the live event encoder 150 may be distributed across the backhaul network 152. The live event manager 118 may communicate with the schedules, rights, and preferences database 130. Accordingly, the live event manager 118 may configure the live stream encoder/packager 148 to encode, package, and publish authorized events available on the backhaul network 152 or from the live production and playout system 140 to the content delivery system 156. In an example embodiment, a 24×7 live playout network that supports a mix of pre-produced media content and live production may be permanently provisioned as a full-time network.

The live stream encoder/packager 148 may read the reference clock 138 embedded by the live event encoder 150 and use the reference clock 138 as the reference time source. Such reference time source may be used to calculate the publish time listed in the disparate live media output stream manifest for the media segments. Additionally, the reference time source may be embedded in a metadata track delivered along with each media segment (e.g. ID3 tag for transport stream files/EMSG for fragmented MP4 files). Accordingly, downstream sub-systems and the consumer devices 110*a*, . . . , 110*n* with a specific reference time for when the content was sent regardless of how long it takes to propagate through the backhaul network 152 and content delivery system 156.

The live event logging system 154 may be synchronized to the same reference clock 138 as the live production and playout system 140. The live event logging system 154 may be configured to support a time offset to compensate for any fixed delay in the live event encoder 150 and backhaul network 152, if the loggers are not on site at the event. The live event logging system 154 may also be configured to support a time offset to compensate for the reaction time of the data loggers. The live event logging system 154 may be further configured to decode the reference clock 138 from the video content source if the delay through the backhaul network 152 is variable.

In accordance with various embodiments, operators, event automation and/or artificial intelligence may log the key events from the live production in the live event logging system 154. Such event logs may be synchronized with the live streaming media based on a timestamp from the reference clock 138 (including an offset if required) for each event. In an embodiment, the logged events may have an associated importance rating, for example, a 1 to 5-star rating for a play in a sporting event.

In some embodiments, timing of the key events may be further refined to get precise start and end points for clipping based on review of the video and live event log in the event timing system 164. In an example, the event timing system 164 may leverage artificial intelligence to refine the timing of the key events. In another embodiment, this system may leverage a human intelligence to refine the timing of the key events.

Timing of the key events may be refined to determine precise start and end points for clipping based on review of the video and live event log in the event timing system 164. In accordance with an embodiment, artificial intelligence may be leveraged to refine the timing of the key events. In accordance with another embodiment, a human effort may be leveraged to refine the timing of the key events.

Further, the events recorded in the live event logging system 154 may be formatted to the normalized event metadata 160. The normalized event metadata 160 may include one or more precise event start and end timing from the event timing system 164. Furthermore, other data may be combined with live event logs, such as images or external data, along with any additional detail of the media segment that was marked.

Further, in order to achieve the object(s) of the present disclosure, the system 100 may change the time base of pre-produced media assets metadata to the reference clock 138. The pre-produced media assets played out live through the live playout 142 may be associated with pre-produced metadata and therefore may not require the live event logging system 154.

In accordance with an embodiment, the pre-produced media assets may be accessed from the media content master storage system 126. The pre-produced media assets metadata may also be available in and accessible from the media content metadata storage system 124. The pre-produced media assets metadata may be synchronized to the media timeline based on the normal play time from the beginning of the file and not the reference clock 138.

The pre-produced media assets metadata may be made available to the normalized event metadata 160 prior to when the content plays. The live playout 142 in the live production and playout system 140 may be synchronized with the reference clock 138 and communicates play events for the pre-produced media assets to the normalized event metadata 160. In an embodiment, multiple play events may exist for a single piece of pre-produced media asset as it is started and stopped to insert ad breaks in the live production and playout system 140. The normalized event metadata 160 may use the time reference of the reference clock 138 and the play events from the live production and playout system 140 to convert the normal play time of the pre-produced media assets metadata to the time reference of the reference clock 138. In accordance with an embodiment, the normalized event metadata 160 may synchronize with the reference clock 138. In accordance with another embodiment, the live production and playout system 140 may include a reference clock timestamp in the play start and end events that are sent. The normalized event metadata 160 may be made available via push or pull methods, and additional systems, such as the content decisioning system 120, to the consumer devices 110a, . . . 110n.

In order to achieve the object(s) of the present disclosure, a disparate live media output stream and program/event re-start manifest may be published. In an embodiment, the live event manager 118 may be configured to publish a programming schedule 111 which may be distributed to the indexing and storage system 132, the stream publishing engine 134, and the stream selection service 136.

In one embodiment, the live input stream manifests for the live channel feeds listed in the various program schedules, such as the programming schedule 111, may be ingested into the indexing and storage system 132. In another embodiment, where additional information, not traditionally carried in the published manifest is to be passed, a proprietary manifest format may be used between the live stream encoder/packager 148 and the indexing and storage system 132.

The indexing and storage system 132 may be configured to continuously index the media segments from each of the live input stream manifests, create a media segment buffer for each live input stream, and enable any live input stream to be joined back in the buffer. In other words, the indexing and storage system 132 may be configured to log all non-programming indicators (such as tags indicating ad breaks), programming indicators (such as program start and program end), and graphical treatment indictors (such as graphic overlays).The indexing and storage system 132 may be further configured to validate that the live input stream is acceptable and ready for inclusion in any on the variants of the disparate live media output stream.

At the scheduled time, the stream publishing engine 134 may be configured to, generate a disparate live media output stream by inserting a new media segment from the scheduled live input stream manifest into the disparate live media output stream manifest on an interval not greater than the previous media segment duration. For certain protocols, the updates may only be required at media content breaks for ads or transitions to the next media content asset. For example, a typical disparate live media output stream manifest may have a defined viewing window of a fixed duration, for example 4 minutes. Once the fixed duration is reached, each time a new media segment is added to the disparate live media output stream manifest the oldest media segment is removed.

In accordance with an embodiment, when an event/program is determined to be eligible to be streamed, based on the on content rights communicated in the programming schedule 111, the stream publishing engine 134 may be configured to generate an alternative disparate live media output stream manifest that continuously grows from the program start indicator until a program end indicator is received from the programming schedule 111 or from indicators in the live event source manifest.

Furthermore, in order to achieve the object(s) of the present invention, a plurality of event/program catch-up manifests may be published. In one embodiment, to publish the plurality of event/program catch-up manifests, the content decisioning system 120 may be configured to accesses the normalized event metadata 160 to identify the timing of the events logged for a live input stream if they are available for the current event/program. The content decisioning system 120 may access the indexing and storage system 132 for the live input stream. In accordance with an embodiment, the content decisioning system 120 may use media segments publish time based on the time reference of the reference clock 138. The content decisioning system 120 may associate the media segments with one or more key events.

In an embodiment, the content decisioning system 120 may be configured to create a plurality of disparate catchup schedules that may provide the consumer devices 110a, . . . , 110n with the one or more key events that have occurred prior to the stream live point simply by listing the media segments associated with such one or more key events. The content decisioning system 120 may be configured based on one or more of the minimum rating of events to include, maximum duration for the catch-up schedule, and/or preferences to determine which key event to include (for example, the user wants highlights of one team versus another for a sporting event catch-up manifest). The content decisioning system 120 may leverage technologies, such as dynamic insertion of targeted non-programming content and customized programming content, to perform the content decisioning substantially in real-time and thereby may provide a fully personalized version of the program/event.

The catch-up schedules created by the content decisioning system 120 may be transmitted to the stream publishing engine 134. The stream publishing engine 134 may generate a disparate stream output manifest that may consist of the reference to the media segment for the one or more key events as listed in the programming schedule 111 and then join the live input stream at the live point. In one embodiment, the catchup schedules may be constantly updated by the content decisioning system 120 as the live production progresses to add new key events and remove less highly ranked events as configured by a stream owner/operator. In accordance with an embodiment, the event catch-up stream may be transmitted to the stream selection service 136 to determine how to access the live input stream, the program/event restart stream, and the plurality of published catch-up streams.

Upon joining the disparate live media output stream, the consumer devices 110a, . . . , 110n may communicate with the stream selection service 136, directly or via a proxy, to determine available options. For example, as the new program/event begins only the join live option may be available to the consumer devices 110a, . . . , 110n. In a scenario when consumer devices 110a, . . . , 110n join after the program/event has started (based on content rights and the stream owner/operator preferences) the program/event restart option may be available. In another scenario, when the consumer devices 110a, . . . , 110n join after the program/event has started (based on content rights and the stream owner/operator preferences), a plurality of program/event catchup options may be available. Upon a selection made by the consumer devices 110a, . . . , 110n, the correct disparate live media output stream is returned to the consumer devices 110a, . . . , 110n.

In an embodiment, the selection made by the consumer devices 110a, . . . , 110n may be stored in the schedules, rights, and preferences database 130 so that the order of the options provided by the stream selection service 136 may be altered in order to make it easier (reduce the number of inputs from the consumer) for the consumer devices 110a, . . . , 110n to make their desired selection in the future.

In order to achieve the object(s) of the present disclosure, a synchronized enhanced experience may be provided to the consumer devices 110a, . . . , 110n. Once a consumer device, for example consumer device 110a of the consumer devices 110a, . . . , 110n, joins the selected disparate live media output stream, the consumer device 110a may decode the time reference of the reference clock 138 embedded in the media segments. The consumer device 110a may communicate with the normalized event metadata 160 to receive additional information about the content in the disparate live media output stream. The timestamps in the normalized event metadata 160 may also be synchronized with the reference clock 138 allowing the additional data to be synchronized with the media playback timeline. Since the delay to process the media and deliver it through the content delivery system 156 is variable and longer than the delay to process and deliver the metadata, it may be critical that the synchronization occurs to avoid spoilers presented based on the data before the actual event is viewed in the media playback timeline. The consumer device 110a may provide an enhanced experience by presenting the additional content from the normalized event metadata 160 including, for example any referenced images, at a correct point in the media playback timeline.

In order to achieve the object(s) of the present disclosure, a plurality of consolidated event/program manifests may be created once the event/program ends. In accordance with an embodiment, an event/program end indicator, received in the programming schedule 111, may indicate that the event/program has ended. Accordingly, the content decisioning system 120 may generate a plurality of disparate schedules to generate a plurality of consolidated versions of the event/program. In one aspect, the consolidated versions may vary based on one or more of a defined time constraint, the number of events, and/or user preferences such as a weighing one team's highlights over another and the like. Furthermore, the content decisioning system 120 may utilize a Live to On-Demand toolkit to move consolidated versions to a permanent storage, in order to ensure availability of such consolidated versions. In an embodiment, the content decisioning system 120 may be configured to leverage dynamic insertion of targeted non-programming content and customized programming content in real-time to generate a fully personalized consolidated version of the event/program.

The content decisioning system 120 may be configured to transmit the consolidated schedules to the stream publishing engine 134. The stream publishing engine 134 may be configured to create a plurality of disparate stream output manifests that may consist of the reference to the media segment for the one or more key events as listed in the schedules, such as the programming schedule 111. The consolidated manifests may be stored in the media storage 158 of the content delivery system 156. Furthermore, the stream selection service 136 may facilitate to determine how to access the consolidated manifests and a description of what each manifest includes along with timing of the consolidated media asset.

In order to achieve the object(s) of the present disclosure, a plurality of consolidated program manifests may be created using pre-produced media assets. In accordance with an embodiment, the Live to On-Demand toolkit may generate the pre-produced media assets. In accordance with another embodiment, the On-Demand assets that are created using the content encoder/packager 128 maybe indexed by the indexing and storage system 132. In the event that the On-Demand content media asset for web distribution does not already exist, the media assets may be scheduled for encoding and packaging by the On-Demand manager 116.

In such cases, media assets may be retrieved from the media content master storage system 126. The media content master storage system 126 is accessed to determine the media asset duration and the location of any non-programming content, such as ad breaks, credits, overlay opportunities and the like. The content encoder/packager 128 may encode and package the media assets for web distribution. The content encoder/packager 128 may be configured to mark the precise ad break locations and condition such media assets, so that such ad break locations fall on segment boundaries of the media segments of the media assets. In addition, the content encoder/packager 128 may be configured to insert tags to mark non-programming content, such as the credits and the potential overlay graphics locations, in the media assets. In an embodiment, the content encoder/packager 128 may further be configured to add indicators, such as in-band triggers, to mark the location of the non-programming content, such as ad breaks, credits, and potential overlay graphic locations, for such protocols that do not constantly query the manifest for new information but instead calculate the next content to be downloaded based on a defined algorithm.

Accordingly, the media asset, prepared for web distribution, including the manifest, may be transmitted to and stored in the media storage 158 of the content delivery system 156. Furthermore, the manifests for the On-Demand media assets listed in the programming schedule 111 generated by the On-Demand manager 116 may be ingested into the indexing and storage system 132. In an embodiment, where additional information not traditionally carried in the published manifest is to be passed, a proprietary manifest format may be used between the content encoder/packager 128 and the indexing and storage system 132. In accordance with an embodiment, the indexing and storage system 132 may be configured to index all media segments from each manifest. In accordance with another embodiment, the indexing and storage system 132 may be configured to log all non-programming content indicators, such as tags indicating ad breaks, programming content indicators, such as program start and program end, and graphical treatment indicators, such as graphic overlays. Furthermore, the indexing and storage system 132 may be configured to validate that the media asset is complete and ready for inclusion in the generated disparate live media output stream.

Further, based on the data set including instructions contained in the programming schedule 111 created by the On-Demand manager 116, the content decisioning system 120 may be configured to accesses the normalized event metadata 160 to acquire the event metadata for the pre-produced media asset using the normal play time reference for timing. Next, based on the programming schedule 111 generated by the On-Demand manager 116, the content decisioning system 120 may access the indexing and storage system 132. The indexing and storage system 132 may be accessed using a zero-time base for the first media segment in the On-Demand media asset where the content decisioning system 120 may be configured to associate the media segments with the one or more key events listed in the normalized event metadata 160.

In accordance with an embodiment, the content decisioning system 120 may be configured to generate a plurality of disparate schedules for the consolidated program. In accordance with an embodiment, the consolidated versions may vary based on one or more of a time, the number of events, and/or user preferences, such as a weighting of sub-storylines, characters, and the like. Furthermore, the content decisioning system 120 may be configured to leverage the dynamic insertion of targeted non-programming content and customized programming content in real-time and provide a fully customized condensed version of the program/event.

Further, the consolidated schedules may be sent to the stream publishing engine 134, where the stream publishing engine 134 may be configured to generate a plurality of disparate stream output manifest that may consist of the reference to the media segment for the one or more key events as listed in the schedules, for example the programming schedule 111. Further, the consolidated manifests may be sent to the media storage 158 of the content delivery system 156. Furthermore, the stream selection service 136 may be provided with a description of how to access the consolidated manifests and a description of what each manifest includes along with timing of the consolidated media asset.

Figure 2:
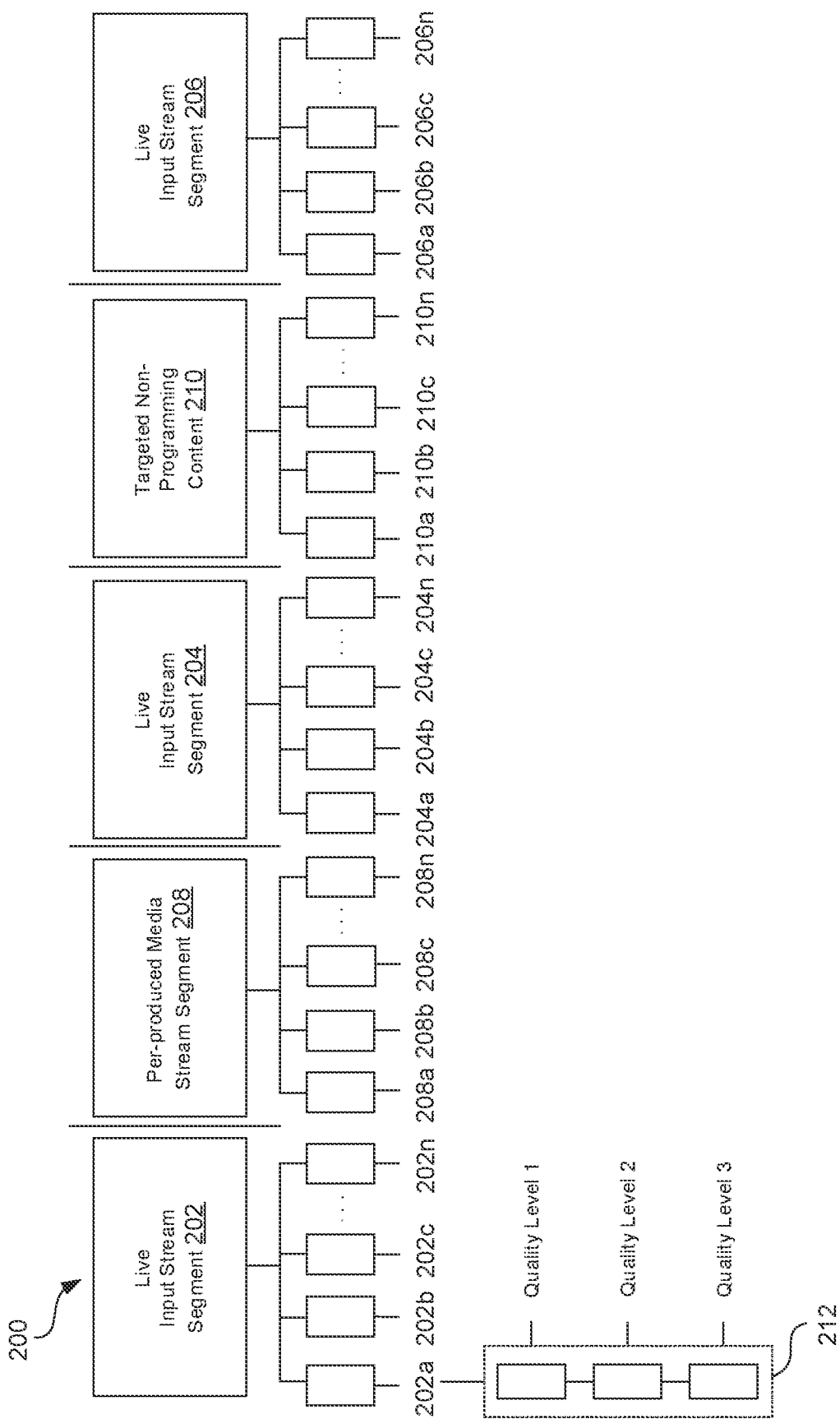
FIG. 2 illustrates segmentation of key events, live input stream and non-programming content, in a framework for publishing a disparate live media output stream manifest that includes one or more media segments corresponding to key events by the media content packaging and distribution system of FIG. 1B, in accordance with an exemplary embodiment of the disclosure.

FIG. 2 illustrates segmentation of live input stream and non-programming content, by the media packaging and distribution system 102 of FIG. 1B, in accordance with an exemplary embodiment of the disclosure. Referring to the exemplary arrangement of FIG. 2, there are shown live input stream segments 202, 204 and 206. There is also shown a pre-produced media segment 208 placed after the live input stream segment 202, and targeted non-programming content 210 placed before the live input stream segment 206. The live input stream segments 202, 204 and 206 may be further segmented into a first set of video segments 202a, 202b, 202c, . . . , 202n, 204a, 204b, 204c, . . . , 204n, and 206a, 206b, 206c, . . . , 206n respectively. By way of example, the segmentation may be executed by a segmenting system (not shown) during a preparation stage of the media assets. In accordance with an embodiment, the segments of the first set of video segments 202a, 202b, 202c, . . . , 202n, the second set of video segments 204a, 204b, 204c, . . . , 204n, and third set of video segments 206a, 206b, 206c, . . . , 206n, may be segmented into consistent length, for example, 10 seconds segments. It may be advantageous to have a consistent and smaller file size of segments to be able to quickly push to the content delivery system 156, and also for quick downloading by a media player at the end-user side, such as on the consumer devices 110a, . . . , 110n.

It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art.

Further, instead of the live input streams and pre-produced media stream and targeted non-programming content, as shown, different arrangements per a programming schedule, such as the programming schedule 111, may be possible. In an illustrative example, where a consumer devices 110a, . . . , 110n joins the stream at the input stream segment 204, certain media segments 202a, . . . , 202n from the input stream segment 202 which are pre-identified as key events in the input stream segment 202, may be first shown to a consumer device, such as the consumer device 110a of the consumer devices 110a, . . . , 110n, based on the programming schedule 111. Further, in certain other examples, pre-produced media segment 208 (or media segments 208a . . . 208n) may be presented to the consumer device 110a before the consumer device 110a joins the live stream at input stream segment 204. In another example, non-programming content may also be inserted at appropriate points when the consumer device 110a joins a live stream segment. For instance, in a specific example, a non-programming content such as an advertisement may be inserted after presentation of the key event segments and before the consumer device 110a joins the live stream segment. However, all the presentations must be synchronized based on the reference clock 138.

In accordance with an embodiment, each segment of the first set of video segments 202a, 202b, 202c, . . . , 202n, the second set of video segments 204a, 204b, 204c, . . . , 204n, and third set of video segments 206a, 206b, 206c, . . . , 206n, may be further processed to be stored at various quality levels, and content encryption modes for the purposes of adaptive bitrate streaming and digital rights management, for example, the video segment 202a may be stored in a plurality of quality levels, for example, high definition (HD), high dynamic range (HDR) video, or different quality levels in accordance with specified pixel resolutions, bitrates, frame rates, and/or sample frequencies. As each of the media content, such as 202 to 206, are encoded, segmented, and stored with the plurality of quality levels in a media content master storage system. The media content may be re-used to create new channels, such as a new disparate live media output stream, without having to re-encode a selected live input stream or a pre-encoded media asset when a new disparate live media output stream is created using the live input streams or a pre-encoded media asset.

It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the consumer devices 110a, . . . , 110n, based on at least the desired delivery method, delivery conditions, content protection requirements, to satisfy operational and technical requirements, as needed. The operational and technical requirements may include but are not limited to, media encoding, media segmentation, programming schedule 111 (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. Further, based on different operational and technical requirements, publishing of disparate live media output stream may be different. The media content that is prepared and distributed may include both the programming content, such as long-form presentations, short-form presentations, news or sporting events; and non-programming content, such as paid advertisements, public service advertisements, or promotional material.

Figure 3:
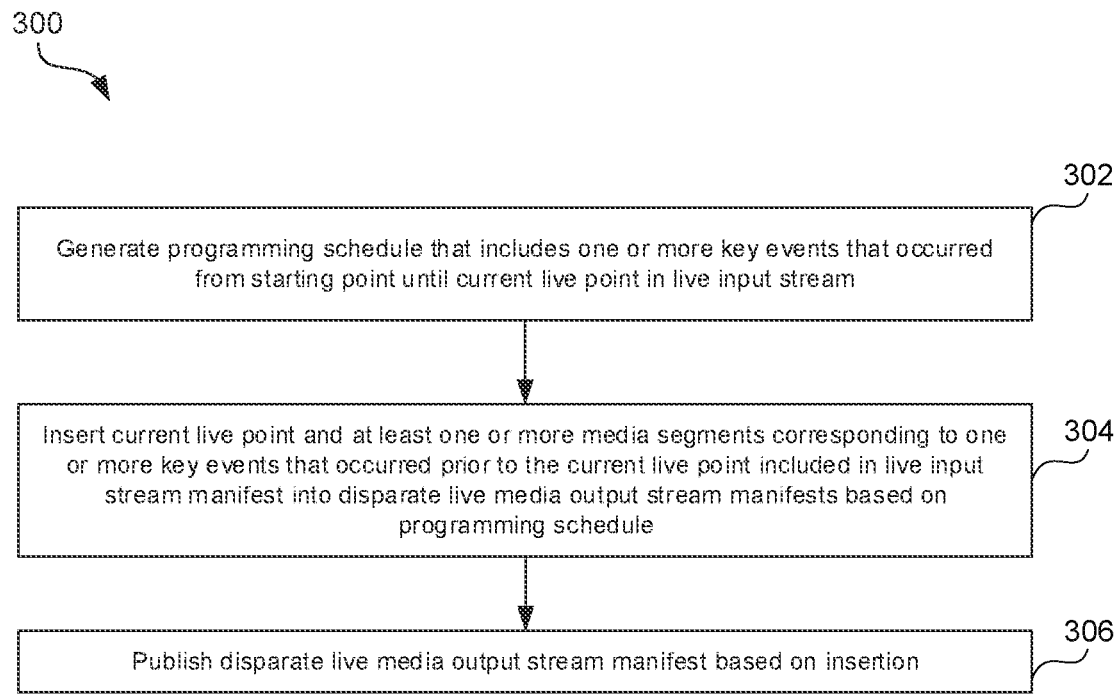
FIG. 3 depicts a flowchart illustrating exemplary operations for publishing, by the media packaging and distribution system, a disparate live media output stream manifest that includes one or more media segments corresponding to key events in a live input stream, in accordance with an exemplary embodiment of the disclosure.

FIG. 3 depicts a flowchart illustrating exemplary operations for publishing, by the media packaging and distribution system 102, a disparate live media output stream manifest that includes one or more media segments corresponding to key events in a live input stream, in accordance with an exemplary embodiment of the disclosure.

At 302, the programming schedule 111 that includes one or more key events that occurred from a starting point until a current live point in a live input stream may be generated. In accordance with another embodiment, the programming schedule 111 may be based on synchronization of one or more disparate sub-systems in the system 100. The reference clock 138 may provide the reference time to synchronize the one or more disparate sub-systems. In an embodiment, the content decisioning system 120 may be configured to create a plurality of disparate catch-up schedules, such as the programming schedule 111, that may provide the consumer devices 110a, . . . , 110n with the one or more key events that have occurred prior to the stream live point simply by listing the media segments associated with such one or more key events. In accordance with an embodiment, the live event manager 118 may analyze the live event schedules and rights, and schedule resources from the schedules, rights, and preferences database 130 to stream such live events to the correct publishing points. The live event manager 118 may further generate a schedule, such as the programming schedule 111, for the indexing and storage system 132 and stream publishing engine 134, if event start over (or re-start) or catch-up variations are desired to be produced.

Synchronization of One or More Disparate Sub-Systems

In an embodiment, a timecode from the reference clock 138 may be embedded in live production and playout system 140 of the one or more disparate sub-systems and available for distribution. The live production and playout system 140 may be configured to generate the live input stream. Thus, to synchronize the disparate sub-systems (or workflows) the live production and playout system 140 may be synchronized to the reference clock 138.

In accordance with an embodiment, the synchronization may be performed by the live event encoder 150 that embeds the reference clock 138 prior to backhaul of a live event in a live input stream. In accordance with another embodiment, the clock inserter 144 in the live production and playout system 140 may be configured to perform the synchronization if there is no need to backhaul the live event to another location for further processing. The reference clock 138 may be embedded as a linear time code, or as a picture timing data in the encoded media content, such as a video feed. Such time may be embedded as SCTE Time Descriptor metadata.

In accordance with an embodiment, an encoded live input stream generated by the live event encoder 150 may be distributed across the backhaul network 152. The live event manager 118 may communicate with the schedules, rights, and preferences database 130. Accordingly, the live event manager 118 may configure the live stream encoder/packager 148 to encode, package, and publish authorized events available on the backhaul network 152 or from the live production and playout system 140 to the content delivery system 156. In an example embodiment, a 24×7 live playout network that supports a mix of pre-produced media content and live production may be permanently provisioned as a full-time network.

In accordance with an embodiment, the live stream encoder/packager 148 may read the reference clock 138 embedded by the live event encoder 150 and use the reference clock 138 as the reference time source. Such reference time source may be used to calculate the publish time listed in the disparate live media output stream manifest for the media segments.

In accordance with an alternative embodiment, the timecode from the reference clock 138 may be recovered and re-embedded in one or more downstream sub-systems of the one or more disparate sub-systems. For example, a first downstream sub-system may utilize the reference clock 138 as a time source that may indicate in the disparate live media output stream manifest when each media segment was published. Further, a second downstream sub-system may embed the reference clock 138 as metadata along with the one or more media segments for delivery to the consumer devices 110a, . . . , 110n. Thus, the reference time source may be embedded in a metadata track delivered along with each media segment (e.g. ID3 tag for transport stream files/EMSG for fragmented MP4 files). Accordingly, downstream sub-systems and the consumer devices 110a, . . . , 110n with a specific reference time for when the content was sent regardless of how long it takes to propagate through the backhaul network 152 and content delivery system 156.

In accordance with an embodiment, the timecode of each of the one or more key events may be associated with corresponding media segments in the live input stream. The corresponding media segments may be determined based on an indication by the reference clock 138 about publishing time of each of the corresponding media segments. In accordance with an embodiment, the timecode from the reference clock 138 may be used as the reference time to log content related to the one or more key events that occur within the live production and playout system 140 of the one or more disparate sub-systems. The live event logging system 154 may be synchronized to the same reference clock 138 as the live production and playout system 140. The live event logging system 154 may be configured to introduce a time offset to compensate for a delay if the live event logging system 154 is located at a different location from the live production and playout system 140 where the delay is one of an encoder delay and/or network delay.

For example, the live event logging system 154 may be configured to support a time offset to compensate for any fixed delay in the live event encoder 150 and backhaul network 152, if the loggers are not on site at the event. The live event logging system 154 may also be configured to support a time offset to compensate for the reaction time of the data loggers. The live event logging system 154 of the one or more disparate sub-systems may be configured to decode the reference clock 138 from the live input stream when delay is not fixed. For example, the live event logging system 154 may be further configured to decode the reference clock 138 from the video content source if the delay through the backhaul network 152 is variable. Thus, live event logging system 154 associates each logged one or more key events with corresponding timecodes.

In accordance with various embodiments, operators, event automation and/or artificial intelligence may log the key events from the live production in the live event logging system 154. Such event logs may be synchronized with the live streaming media based on a timestamp from the reference clock 138 (including an offset if required) for each event. In an embodiment, the logged key events may have an associated importance rating and rated on a rating scale, for example, a 1 to 5-star rating for a play in a sporting event.

In some embodiments, timing of the key events may be further refined to get precise start and end points for clipping based on review of the video and live event log in the event timing system 164. In an example, the event timing system 164 may leverage artificial intelligence to refine the timing of the key events. In another embodiment, this system may leverage a human intelligence to refine the timing of the key events.

Timing of the key events may be refined to determine precise start and end points for clipping based on review of the video and live event log in the event timing system 164. In accordance with an embodiment, artificial intelligence may be leveraged to refine the timing of the key events. In accordance with another embodiment, a human effort may be leveraged to refine the timing of the key events.

In accordance with an embodiment, the event timing system 164 may be configured to associate the one or more key events with additional information regarding the one or more key event. Accordingly, a normalized event metadata scheme may be generated based on a listing of the one or more key events with associated timecode, rating, and additional information or links for media and/or data. Thus, the events recorded in the live event logging system 154 may be formatted to the normalized event metadata 160. The normalized event metadata 160 may include one or more precise event start and end timing from the event timing system 164. Furthermore, other data may be combined with live event logs, such as images or external data, along with any additional detail of the media segment that was marked.

At 304, a current live point and at least one or more media segments corresponding to one or more key events that occurred prior to the current live point included in the live input stream manifest may be inserted into disparate live media output stream manifests based on the programming schedule. In an embodiment, the stream publishing engine 134 may be configured to insert the current live point and at least one or more media segments corresponding to the one or more key events that occurred prior to the current live point included in a live input stream manifest into the disparate live media output stream manifests based on the programming schedule 111.

Publishing a Plurality of Event/Program Catch-Up Manifests

Prior to the insertion, the content decisioning system 120 may be configured to determine which of the one or more key events to include in the disparate live media output stream manifests that include the one or more key events prior to the current live point. In one embodiment, to publish the plurality of event/program catch-up manifests, the content decisioning system 120 may be configured to accesses the normalized event metadata 160 to identify the timing of the key events logged for a live input stream if they are available for the current event/program. The content decisioning system 120 may access the indexing and storage system 132 for the live input stream. In accordance with an embodiment, the content decisioning system 120 may use media segments publish time based on the time reference of the reference clock 138. The content decisioning system 120 may associate the media segments with one or more key events.

In accordance with various embodiments, the content decisioning system 120 may be configured to limit a number of the one or more key events to be included based on a maximum time threshold and include the one or more key events with a rating that exceeds a threshold rating. In this regard, the content decisioning system 120 may be configured based on one or more of the minimum rating of events to include, maximum duration for the catch-up schedule, and/or preferences to determine which key event to include (for example, the user wants highlights of one team versus another for a sporting event catch-up manifest). The content decisioning system 120 may leverage technologies, such as dynamic insertion of targeted non-programming content and customized programming content, to perform the content decisioning substantially in real-time and thereby may provide a fully personalized version of the program/event.

In accordance with an embodiment, the content decisioning system 120 may be configured to continuously monitor the one or more key events, and log new key events and/or modify a rating of the one or more key events. In this regard, the catch-up schedules may be constantly updated by the content decisioning system 120 as the live production progresses to add new key events and remove less highly ranked events as configured by a stream owner/operator. In accordance with an embodiment, the event catch-up stream may be transmitted to the stream selection service 136 to determine about how to access the live input stream and the program/event restart stream. The catch-up schedules created by the content decisioning system 120 may be transmitted to the stream publishing engine 134. The stream publishing engine 134 may generate a disparate stream output manifest that may consist of the reference to the media segment for the one or more key events as listed in the programming schedule 111 and then join the live input stream at the live point.

Upon joining the disparate live media output stream, the consumer devices 110a, . . . , 110n may communicate with the stream selection service 136, directly or via a proxy, to determine available options. For example, as the new program/event begins only the join live option may be available to the consumer devices 110a, . . . , 110n. In a scenario when consumer devices 110a, . . . , 110n join after the program/event has started (based on content rights and the stream owner/operator preferences) the program/event restart option may be available. In another scenario, when the consumer devices 110a, . . . , 110n join after the program/event has started (based on content rights and the stream owner/operator preferences), a plurality of program/event catch-up options may be available. Upon a selection made by the consumer devices 110a, . . . , 110n, the correct disparate live media output stream is returned to the consumer devices 110a, . . . , 110n.

In an embodiment, the selection made by the consumer devices 110a, . . . , 110n may be stored in the schedules, rights, and preferences database 130 so that the order of the options provided by the stream selection service 136 may be altered in order to make it easier (reduce the number of inputs from the consumer) for the consumer devices 110a, . . . , 110n to make their desired selection in the future.

Creating a Plurality of Consolidated Event/Program Manifests Once the Event/Program Ends In accordance with an embodiment, an event/program end indicator, received in the programming schedule 111, may indicate that the event/program has ended. The programming schedule 111 may further comprise one or more indicators to mark discontinuities between key events. For example, an overlay indicator of the one or more indicators may be scheduled to show non-programming content during the one or more key events. Further, a non-programming indicator may be scheduled before or after a sequence of the one or more key events to allow for additional or alternative non-programming content, or during the one or more key events based on a rule to place an non-programming content after a defined number of key events to allow for additional or alternative non-programming content.

Accordingly, the content decisioning system 120 may generate a plurality of disparate schedules to generate a plurality of consolidated versions of the event/program. In one aspect, the consolidated versions may vary based on one or more of a defined time constraint, the number of events, and/or user preferences such as a weighing one team's highlights over another and the like. Furthermore, the content decisioning system 120 may utilize a Live to On-Demand toolkit to move consolidated versions to a permanent storage, in order to ensure availability of such consolidated versions. In an embodiment, the content decisioning system 120 may be configured to leverage a dynamic insertion of targeted non-programming content and customized programming content in real-time to generate a fully personalized consolidated version of the event/program.

The content decisioning system 120 may be configured to transmit the consolidated schedules to the stream publishing engine 134. The stream publishing engine 134 may be configured to create a plurality of disparate stream output manifests that may consist of the reference to the media segment for the one or more key events as listed in the schedules, such as the programming schedule 111. The consolidated manifests may be stored in the media storage 158 of the content delivery system 156. Furthermore, the stream selection service 136 may facilitate to determine how to access the consolidated manifests and a description of what each manifest includes along with timing of the consolidated media asset.

At 306, a disparate live media output stream manifest may be published based on the insertion. In an embodiment, the stream publishing engine 134 may be configured to publish the disparate live media output stream manifests in the content delivery system 156 based on the received consolidated schedules. The publication of the disparate live media output stream manifest may be based on the insertion of a current live point and at least one or more media segments.

In accordance with an embodiment, a consumer device, for example the consumer device 110a of the consumer devices 110a, . . . , 110n, joins the selected disparate live media output stream. The consumer device 110a may decode the time reference of the reference clock 138 embedded in the media segments of the received disparate live media output stream. The consumer device 110a may communicate with the normalized event metadata 160 to receive additional information about the content in the disparate live media output stream. The timestamps in the normalized event metadata 160 may also be synchronized with the reference clock 138 allowing the additional data to be synchronized with the media playback timeline. Since the delay to process the media and deliver it through the content delivery system 156 is variable and longer than the delay to process and deliver the metadata, it may be critical that the synchronization occurs to avoid spoilers presented based on the data before the actual event is viewed in the media playback timeline. The consumer device 110a may provide an enhanced experience by presenting the additional content from the normalized event metadata 160 including, for example any referenced images, at a correct point in the media playback timeline.

Figure 4:
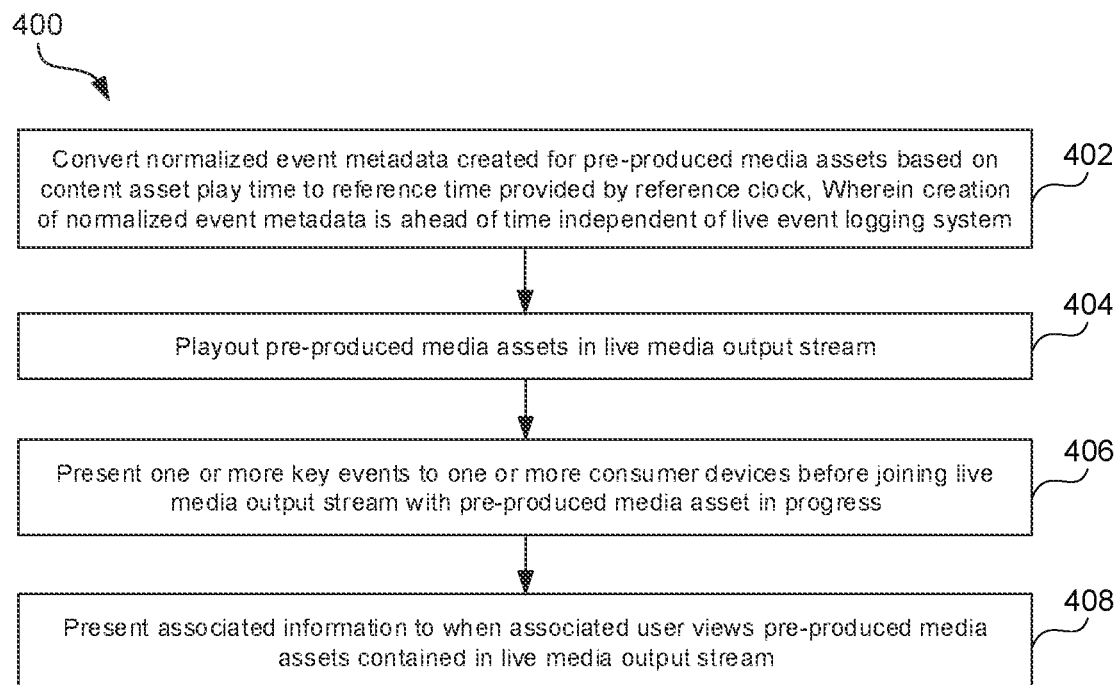
FIG. 4 depicts another flowchart illustrating exemplary operations for publishing, by the media packaging and distribution system, a disparate live media output stream manifest that includes one or more media segments corresponding to key events in a pre-produced media stream, in accordance with an exemplary embodiment of the disclosure.

FIG. 4 depicts a flowchart illustrating exemplary operations for publishing, by the media packaging and distribution system 102, a disparate live media output stream manifest that includes one or more media segments corresponding to key events in pre-produced media assets, in accordance with an exemplary embodiment of the disclosure.

At 402, the normalized event metadata 160 may be converted for pre-produced media assets based on content asset play time to a reference time provided by the reference clock 138, wherein creation of the normalized event metadata 160 is ahead of time independent of the live event logging system 154. In accordance with an embodiment, the normalized event metadata 160 may reference time provided by the reference clock 138 and the play events from the live playout 142 to convert the normal play time of the content asset metadata to the reference time of the reference clock 138. In accordance with an embodiment, the live playout 142 provides a start and stop time for the pre-produced media assets to support the conversion of the normalized event metadata 160 from play time to reference time of the reference clock 138. Additionally, multiple start and stop times per pre-produced media assets allow for a stop to insert non-programming content and to restart the pre-produced media assets during the playout.

In this regard, the pre-produced media assets may be played out live through the live playout 142 in the live production and playout system 140 may be associated with pre-produced metadata and therefore may not require the live event logging system 154. The pre-produced media assets may be accessed from the media content master storage system 126, and the pre-produced media assets metadata may be available in and accessible from the media content metadata storage system 124. The pre-produced media assets metadata may be synchronized to the media timeline based on the normal play time from the beginning of the file and not the reference clock 138.

The pre-produced media assets metadata may be made available to the normalized event metadata 160 prior to when the content plays. The live playout 142 in the live production and playout system 140 may be synchronized with the reference clock 138 and communicates play events for the pre-produced media assets to the normalized event metadata 160. In an embodiment, multiple play events may exist for a single piece of pre-produced media asset as it is started and stopped to insert ad breaks in the live production and playout system 140. The normalized event metadata 160 may use the time reference of the reference clock 138 and the play events from the live production and playout system 140 to convert the normal play time of the pre-produced media assets metadata to the time reference of the reference clock 138. In accordance with an embodiment, the normalized event metadata 160 may synchronize with the reference clock 138. In accordance with another embodiment, the live production and playout system 140 may include a reference clock timestamp in the play start and end events that are sent. The normalized event metadata 160 may be made available via push or pull methods, and additional systems, such as the content decisioning system 120, to the consumer devices 110a, . . . , 110n.

At 404, the pre-produced media assets may be played out in a disparate live media output stream. In accordance with an embodiment, live playout 142 in the live production and playout system 140 may be configured to playout the pre-produced media asset in the disparate live media output stream. In accordance with an embodiment, the live playout 142 may send start and end messages to a system publishing the normalized event metadata 160 each time a pre-produced media asset is started and stopped. The pre-produced media assets may be started and stopped multiple times during live playback to support the inclusion of non-programming content, such as ads. The start and stop messages may include a timestamp leveraging the reference clock 138 for each key event. The system that publishes the normalized event metadata 160 may be synchronized with the reference clock 138 to record the time when each key event is received.

Converting Time Base of Pre-Produced Content Metadata to a Reference Time

In accordance with an embodiment, the normalized event metadata 160 may be published by leveraging the time stamps to convert the timestamps for the key events to the reference time of the reference clock 138. The conversion may be performed to the remainder of the key event data each time a program end and subsequent program start is received to account for the time allocated to non-programming content, such as advertising.

In accordance with another embodiment, along with the publishing of the normalized event metadata 160, zero-time base metadata may also be published when the pre-produce media assets are viewed as an On-Demand asset and not included in a live stream with a reference time. In such case, ID for the On-Demand media asset is different than the ID for the live input stream. One or more consumers associated with the consumer devices 110a, . . . , 110n may view the On-Demand media asset in the disparate live media output stream while others may choose to view the On-Demand media asset if available.

In accordance with an embodiment, content decisioning system 120 may leverage the zero-time base metadata to create a plurality of consolidated (or condensed) program manifests for a pre-produced media asset. The number of key events to include may be limited based on a maximum time threshold. Further, only key events above a certain score on the ratings scale may be included. Furthermore, only key events with particular participants or descriptions weighted higher in the decisioning algorithm may be included.

At 406, one or more key events may be presented to one or more consumer devices 110a . . . 110n before joining live media output stream with the pre-produced media asset in progress. In an embodiment, the content delivery system 156, in operation with the stream publishing engine 134 and stream selection service 136 may be configured to present one or more key events to the one or more consumer devices 110a . . . 110n.

At 408, additional information may be presented to the consumer devices 110a, . . . , 110n when associated user views the pre-produced media assets contained in the live media output stream. In accordance with an embodiment, the additional information provided by the normalized event metadata 160 may be presented to the consumer devices 110a, . . . , 110n when associated user views the pre-produced media assets contained in the live media output stream.

In accordance with an embodiment, once a consumer device, for example consumer device 110a of the consumer devices 110a, . . . , 110n, joins the selected disparate live media output stream, the consumer device 110a may decode the time reference of the reference clock 138 embedded in the media segments. The consumer device 110a may communicate with the normalized event metadata 160 to receive additional information about the content in the disparate live media output stream. The timestamps in the normalized event metadata 160 may also be synchronized with the reference clock 138 allowing the additional data to be synchronized with the media playback timeline. Since the delay to process the media and deliver it through the content delivery system 156 is variable and longer than the delay to process and deliver the metadata, it may be critical that the synchronization occurs to avoid spoilers presented based on the data before the actual event is viewed in the media playback timeline. The consumer device 110a may provide an enhanced experience by presenting the additional content from the normalized event metadata 160 including, for example any referenced images, at a correct point in the media playback timeline.

Generating a Plurality of Consolidated Program Manifests Using Pre-Produced Media Assets In accordance with an embodiment, the Live to On-Demand toolkit may generate the pre-produced media assets. In accordance with another embodiment, the On-Demand assets that are created using the content encoder/packager 128 maybe indexed by the indexing and storage system 132. In the event that the On-Demand content media asset for web distribution does not already exist, the media assets may be scheduled for encoding and packaging by the On-Demand manager 116.

In such cases, media assets may be retrieved from the media content master storage system 126. The media content master storage system 126 is accessed to determine the media asset duration and the location of any non-programming content, such as ad breaks, credits, overlay opportunities and the like. The content encoder/packager 128 may encode and package the media assets for web distribution. The content encoder/packager 128 may be configured to mark the precise ad break locations and condition such media assets, so that such ad break locations fall on segment boundaries of the media segments of the media assets. In addition, the content encoder/packager 128 may be configured to insert tags to mark non-programming content, such as the credits and the potential overlay graphics locations, in the media assets. In an embodiment, the content encoder/packager 128 may further be configured to add indicators, such as in-band triggers, to mark the location of the nonprogramming content, such as ad breaks, credits, and potential overlay graphic locations, for such protocols that do not constantly query the manifest for new information but instead calculate the next content to be downloaded based on a defined algorithm.

Accordingly, the media asset, prepared for web distribution, including the manifest, may be transmitted to and stored in the media storage 158 of the content delivery system 156. Furthermore, the manifests for the On-Demand media assets listed in the programming schedule 111 generated by the On-Demand manager 116 may be ingested into the indexing and storage system 132. In an embodiment, where additional information not traditionally carried in the published manifest is to be passed, a proprietary manifest format may be used between the content encoder/packager 128 and the indexing and storage system 132. In accordance with an embodiment, the indexing and storage system 132 may be configured to index all media segments from each manifest. In accordance with another embodiment, the indexing and storage system 132 may be configured to log all non-programming content indicators, such as tags indicating ad breaks, programming content indicators, such as program start and program end, and graphical treatment indicators, such as graphic overlays. Furthermore, the indexing and storage system 132 may be configured to validate that the media asset is complete and ready for inclusion in the generated disparate live media output stream.

Further, based on the data set including instructions contained in the programming schedule 111 created by the On-Demand manager 116, the content decisioning system 120 may be configured to accesses the normalized event metadata 160 to acquire the event metadata for the pre-produced media asset using the normal play time reference for timing. Next, based on the programming schedule 111 generated by the On-Demand manager 116, the content decisioning system 120 may access the indexing and storage system 132. The indexing and storage system 132 may be accessed using a zero-time base for the first media segment in the On-Demand media asset where the content decisioning system 120 may be configured to associate the media segments with the one or more key events listed in the normalized event metadata 160.

In accordance with an embodiment, the content decisioning system 120 may be configured to generate a plurality of disparate schedules for the consolidated program. In accordance with an embodiment, the consolidated versions may vary based on one or more of a time, the number of events, and/or user preferences, such as a weighting of sub-storylines, characters, and the like. Furthermore, the content decisioning system 120 may be configured to leverage the dynamic insertion of targeted non-programming content and customized programming content in real-time and provide a fully customized condensed version of the program/event.

Further, the consolidated schedules may be sent to the stream publishing engine 134, where the stream publishing engine 134 may be configured to generate a plurality of disparate stream output manifest that may consist of the reference to the media segment for the one or more key events as listed in the schedules, for example the programming schedule 111. Further, the consolidated manifests may be sent to the media storage 158 of the content delivery system 156. Furthermore, the stream selection service 136 may be provided with a description of how to access the consolidated manifests and a description of what each manifest includes along with timing of the consolidated media asset.

Figure 5:
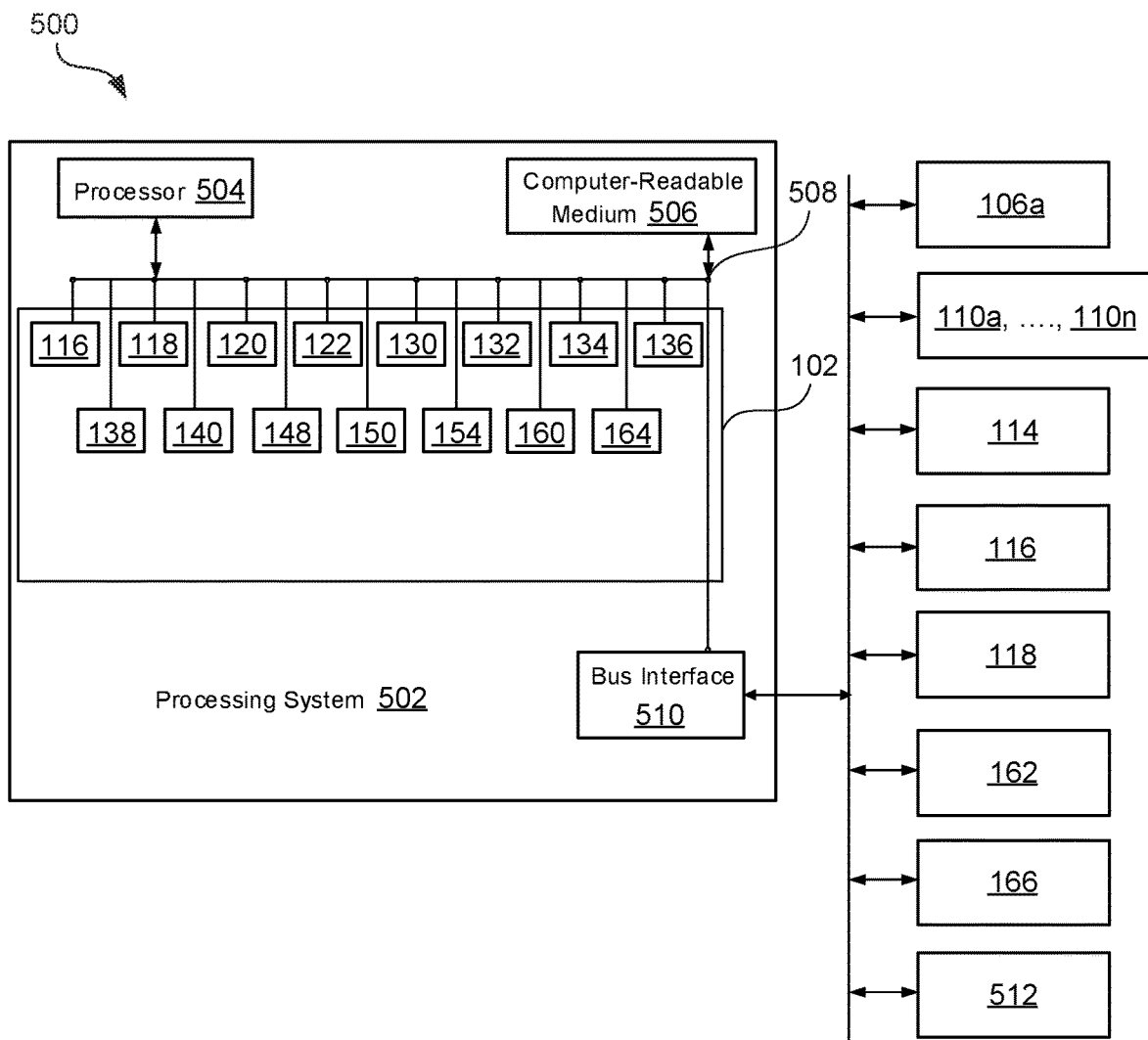
FIG. 5 is a conceptual diagram illustrating an example of a hardware implementation for the media packaging and distribution system employing a processing system for publishing a disparate live media output stream manifest that includes one or more media segments corresponding to key events, in accordance with an exemplary embodiment of the disclosure.

FIG. 5 is a conceptual diagram illustrating an example of a hardware implementation for a media packaging and distribution system 102 employing a processing system for publishing a disparate live media output stream manifest that includes one or more media segments corresponding to key events, in accordance with an exemplary embodiment of the disclosure. Referring to FIG. 5, the hardware implementation shown by a representation 500 for the media packaging and distribution system 102 employs a processing system 502 for publishing a disparate live media output stream manifest that includes one or more media segments corresponding to key events, in accordance with an exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the live event encoder 150, the content delivery system 156, the live stream encoder/packager 148, live event manager 118, the On-Demand manager 116, the schedules, rights, and preferences database 130, as described in detail in FIGS. 1A and 1B. It may be noted that other elements of the system (although not shown) may also form part of the processing system 502.

The hardware processor 504 may be configured to manage the bus 508 and general processing, including the execution of a set of instructions stored on the non-transitory computer-readable medium 506. The set of instructions, when executed by the processor 504, causes the media packaging and distribution system 102 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be used for storing data that is manipulated by the processor 504 when executing the set of instructions. The data is stored for short periods or in the presence of power. The non-transitory computer-readable medium 506 may also be configured to store data for one or more of the components of the media packaging and distribution system 102 illustrated in FIGS. 1A and 1B.

The bus 508 is configured to link together various circuits. In this example, the media packaging and distribution system 102 employing the processing system 502 and the non-transitory computer-readable medium 506 may be implemented with bus architecture, represented generally by bus 508. The bus 508 may include any number of interconnecting buses and bridges depending on the specific implementation of the media packaging and distribution system 102 and the overall design constraints. The bus interface 510 may be configured to provide an interface between the bus 508 and other circuits, such as transceiver 512, and external devices, such as the source devices 112, the external data source 114, and the consumer devices 110a, . . . , 110n.

The transceiver 512 may be configured to provide a communication of the media packaging and distribution system 102 with various other apparatus, such as the Ad decisioning servers 106a, . . . , 106n, the consumer devices 110a, . . . , 110n, the external data source 114, and the source devices 112, via the network 108. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the live event encoder 150, the content delivery system 156, the live stream encoder/packager 148, live event manager 118, On-Demand manager 116, schedules, rights, and preferences database 130 along with other components of the media packaging and distribution system 102 may include software that may be executed across a single or multiple processing environments.

In accordance with an embodiment of the disclosure, the processor 504, the non-transitory computer-readable medium 506, or a combination of both may be configured or otherwise specially programmed to execute the operations or functionality of the live event encoder 150, the content delivery system 156, the live stream encoder/packager 148, the live event manager 118, the On-Demand manager 116, the repository of schedules, rights, and preferences database 130, and/or various other components described herein, as described with respect to FIGS. 1A-4.

Various embodiments of the disclosure comprise a media content packaging and distribution system 102 that may be configured to publish a disparate live media output stream manifest that includes one or more media segments corresponding to key events in a live input stream. The system comprises content decisioning system 120 and/or a live event manager 118 and/or an On-Demand manager 116 which may be configured to generate the programming schedule 111 that includes one or more key events that occurred from a starting point until a current live point in a live input stream. In accordance with an embodiment, the programming schedule 111 is generated based on a synchronization of one or more disparate sub-systems in the system. In accordance with another embodiment, a reference clock 138 provides a reference time to synchronize the one or more disparate sub-systems. The system further comprises the stream publishing engine 134 that may be configured to insert the current live point and at least one or more media segments corresponding to the one or more key events that occurred prior to the current live point included in a live input stream manifest into a disparate live media output stream manifests, based on the programming schedule. Further, the system comprises the content delivery system 156 in operation with the stream publishing engine 134 and the stream publishing service 113A which may be configured to publish the disparate live media output stream manifest. In accordance with an embodiment, the publication may be based on the insertion. In accordance with an embodiment of the present disclosure, the programming schedule 111 may be a catch-up schedule.

In accordance with an embodiment, the media packaging and distribution system 102 disclosed herein further comprises the content decisioning system 120 in operation with the schedules, rights, and preferences database 130, configured to customize one or more key events included in the disparate live media output stream manifests.

In accordance with another embodiment, the media packaging and distribution system 102 disclosed herein further comprises the live event encoder 150 configured to embed a timecode from the reference clock 138 in the live production and playout system 140 of the one or more disparate sub-systems and available for distribution. In accordance with an embodiment, the live production and playout system 140 is configured to generate the live input stream. Further, in certain embodiments, a time code from the reference clock 138 is recovered and re-embedded in one or more downstream sub-systems of the one or more disparate sub-systems. In one example, the first downstream sub-system uses the reference clock 138 as a time source that indicates in the disparate live media output stream manifest when each media segment was published. In another example, a second downstream sub-system embeds the reference clock as metadata along with the one or more media segments for delivery to one or more consumer devices.

In accordance with another embodiment, the media packaging and distribution system 102 disclosed herein further comprises live event logging system 154 which may be configured to log content related to the one or more key events that occur within a live production and playout system 140 of the one or more disparate sub-systems. In accordance with an embodiment, the live event logging system 154 may use a time code from the reference clock is used as the reference time.

In accordance with another embodiment, the live event logging system 154 of the media packaging and distribution system 102, may further be configured to introduce a time offset to compensate for a delay if live event logging system 154 is located at a different location from the live production and playout system 140 where the delay is one of an encoder delay and/or network delay.

In accordance with another embodiment, the live event logging system 154 of the media packaging and distribution system 102 may further be configured to decode the Reference/Master clock from the live input stream when delay is not fixed.

In accordance with another embodiment, the live event logging system 154 of the media packaging and distribution system 102 may be configured to associate each logged one or more key events with corresponding timecodes. In accordance with an embodiment of the present disclosure, the media packaging and distribution system 102 disclosed herein further comprises the stream publishing engine 134 113 that may be configured to rate the one or more key events on a rating scale.

In accordance with an embodiment of the present disclosure, the media packaging and distribution system 102 disclosed herein further comprises Normalized event metadata 160 that may be configured to associate the one or more key events with additional information regarding the one or more key event. In accordance with another embodiment, the normalized event metadata 160 may be configured to generate a normalized event metadata 160 scheme based on a listing of the one or more key events with associated timecode, rating, and additional information or links for media and/or data.

In accordance with another embodiment of the present disclosure, the media packaging and distribution system 102 disclosed herein further comprises content decisioning system 120 configured to determine which of the one or more key events to include in the disparate live media output stream manifests that includes the one or more key events prior to the current live point.

In accordance with another embodiment of the present disclosure, the content decisioning system 120 may further be configured to limit number of the one or more key events to be included based on a maximum time threshold. Further, in accordance with another embodiment, the content decisioning system 120 may be configured to include the one or more key events with a rating that exceeds a threshold rating.

In accordance with another embodiment of the present disclosure, the media packaging and distribution system 102 disclosed herein further comprises the content decisioning system 120 that may further be configured to continuously monitor the one or more key events. Further, the content decisioning system 120 may also be configured to log new key events and/or modify a rating of the one or more key events.

In accordance with another embodiment of the present disclosure, the content decisioning system 120 may also be configured to associate a timecode of each of the one or more key events with corresponding media segments in the live input stream. In one aspect, the corresponding media segments may be determined based on an indication by the reference clock 138 about publishing time of each of the corresponding media segments.

In accordance with another embodiment of the present disclosure, the media packaging and distribution system 102 disclosed herein comprises generation of the programming schedule 111, wherein the generated programming schedule 111 comprises one or more indicators that may be generated by the indexing and storage system 132 to mark discontinuities between key events.

In accordance with another embodiment of the present disclosure, the media packaging and distribution system 102 disclosed herein comprises the indexing and storage system 132 that may be configured to programming schedule 111 an overlay indicator of the one or more indicators to show non-programming content during the one or more key events. Further, the indexing and storage system 132 may be configured to programming schedule 111 a non-programming indicator before or after a sequence of the one or more key events to allow for additional or alternative non-programming content, or during the one or more key events based on a rule to place a non-programming content after a defined number of key events to allow for additional or alternative non-programming content.

In accordance with an embodiment of the present disclosure the content, decisioning system 115 may be configured to generate a condensed version of a pre-encoded media asset once the pre-encoded media asset ends, based on metadata associated with one or more key events in the pre-encoded media asset.

In accordance with another embodiment, of the present disclosure, a consumer device of the one or more consumer devices 110a, . . . , 110n may be configured to receive and decode the reference clock 138 as each media segment is played back. In accordance with an embodiment of the present disclosure, the consumer devices 110a, . . . , 110n may be configured to receive normalized event metadata 160 and build a timeline for additional information that enhances consumer experience, and wherein the timeline is based on the reference clock 138 present in the disparate live media output stream and used to timestamp events in the normalized event metadata 160.

In accordance with another embodiment of the present disclosure, the consumer devices 110a, . . . , 110n may further be configured to identify links to media or data in the normalized event metadata 160 and present media or data along with other specified data at a correct point in the timeline.

In accordance with another embodiment of the present disclosure, the media packaging and distribution system 102 disclosed herein a live production and playout system 140 that may be configured to convert normalized event metadata 160 created for pre-produced media assets based on content asset play time to a reference time provided by a reference clock, wherein creation of the normalized event metadata 160 is ahead of time independent of live event logging system 154. Further, the live production and playout system 140 may be configured to playout the pre-produced media assets in a disparate live media output stream;

Furthermore, the content delivery system 156, in operation with the stream publishing engine 134 and stream selection service 136 of the media packaging and distribution system 102, may be configured to present one or more key events to one or more consumer devices 110a . . . 110n before joining the live media output stream with the pre-produced media asset in progress.

Also, in accordance with another embodiment of the present disclosure, the consumer devices 110a, . . . , 110n may be configured to receive associated when a user associated with the consumer devices 110a, . . . , 110n view the pre-produced media assets contained in the live media output stream.

In accordance with another embodiment of the present disclosure, the live production and playout system 140 may be linked to the reference clock 138. Furthermore, the live production and playout system 140 may be configured to provide a start and stop time for the pre-produced media assets to support the conversion of the normalized event metadata 160 from play time to reference clock time. In accordance with an embodiment of the present disclosure, multiple start and stop times per pre-produced media assets allow for a stop to insert non-programming content and to restart the pre-produced media assets during the playout. Furthermore, in accordance with an embodiment of the present disclosure, the system may further be configured to identify the content as On-Demand content and/or a live content.

Various embodiments of the disclosure may provide a computer-readable medium, such as the non-transitory computer-readable medium 506, having stored thereon, computer-implemented instruction that when executed by the processor 504 causes the media packaging and distribution system 102 to publish a disparate live media output stream manifest that includes one or more media segments corresponding to key events. In accordance with an embodiment, the processor 504 causes the media packaging and distribution system 102 to execute operations to generate the programming schedule 111 that includes one or more key events that occurred from a starting point until a current live point in a live input stream. In an embodiment, the programming schedule 111 may be generated based on a synchronization of one or more disparate sub-systems in the system. In accordance with another embodiment, a reference clock may provide a reference time to synchronize the one or more disparate sub-systems. The processor 504 causes the media packaging and distribution system 102 to execute operations to insert the current live point and at least one or more media segments corresponding to the one or more key events that occurred prior to the current live point included in a live input stream manifest into a disparate live media output stream manifests based on the programming schedule. The processor 504 causes the media packaging and distribution system 102 to execute operations to publish the disparate live media output stream manifests based on the insertion.

In another embodiment, the disclosure may provide a computer-readable medium, such as the non-transitory computer-readable medium 506, having stored thereon, computer-implemented instruction that when executed by the processor 504 causes the media packaging and distribution system 102 to convert normalized event metadata 160 created for pre-produced media assets based on content asset play time to a reference time provided by a reference clock. In an embodiment, creation of the normalized event metadata 160 is ahead of time independent of live event logging system. The processor 504 causes the media packaging and distribution system 102 to execute operations to playout the pre-produced media assets in a disparate live media output stream. Further, the processor 504 causes the media packaging and distribution system 102 to present one or more key events to one or more consumer devices before joining the live media output stream with the pre-produced media asset in progress and present additional information to the consumer device when associated user views the pre-produced media assets contained in the live media output stream.

Traditional broadcasting systems do not support recording and playback of live content unless such recording and playback is pre-scheduled before the commencement of live content stream. Furthermore, traditional systems do not provide any means to incorporate highlights that may allow a consumer device joining a live stream post start of such live stream to catch-up to the current live point. Also, traditional broadcasting system also fails to provide customized highlights based on customer preferences before the consumer device catches up to a current live point in the live stream.

The present disclosure leverages an understanding of the modern web streaming protocols to provide a low-cost system to generate an event manifest that allows the consumer to restart an in-progress program from the beginning without having to pre-schedule a recording.

For live events, for example, the present system discloses synchronization of metadata, marking the key events that provide the consumer with an additional option to quickly catch-up to the live point by viewing only the key events from earlier. In sports, for example, a consumer may be shown game highlights from before joining the stream and could then join the stream at the live point. This may be achieved, in accordance with the present disclosure, by manipulating the text-based manifests to include only those media segments covering the highlights as defined by the event metadata. As the media segment durations continue to decrease to below 2 seconds, the accuracy of the highlight clipping will only become more refined.

The presently disclosed system may further enhance user experience by providing additional metadata (e.g. images, stats or facts, trivia, etc.) the consumer where such metadata is synched with the media content enabling presentation of the additional metadata at the exact time as the media content. The present disclosure also provides creation of a condensed event archive upon ending of an event. This may consist only of the highlights or key events that occurred throughout the course of the program. Furthermore, the catch-up and the condensed event may be customized based on customer preference further enhancing consumer experience.

The advantageous effects of the present disclosure may also be leveraged to provide catch-up version of pre-produced media assets (a TV show or a Movie). The TV or movie may be played live or be played On-Demand. In an example, the metadata may be produced identifying individual scenes, the actors in each scene, and/or a description of the scene. Further, as discussed in the present disclosure, a rating of the importance of the scene to the content storyline may be used to enable a decision as to what may be included in a catch-up manifest. Similarly, a condensed version of such pre-produced media assets may also be generated and stored. Personalization may also be achieved, as discussed in the present disclosure thereby enhancing consumer experience and ensuring consumer involvement in the content.

As would be appreciated by those skilled in the art, the media content itself does not need to be processed beyond the initial creation of the live stream encoded for web distribution. Therefore the present discourse provides an extremely inexpensive way to provide add these new options into content distribution systems. The present disclosure solely incurs cost required to manipulate the text-based manifests that provide the instructions for the client players to execute. The disclosure also envisages supporting of targeted ad insertion on a per-client basis through the insertion of tags in the live stream manifest and can further leverage the processing power of the individual clients to insert targeted channel graphics and overlay advertisements and promotions. In addition to the above, the presently disclosed system also provides various other advantages and technological advancements over the existing content distribution systems which would be apparent to a person skilled in the art on reading the present disclosure.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
a memory for storing instructions; and
a processor configured to execute the instructions, and based on the executed instructions, the processor is configured to:
obtain a start time and a stop time for a pre-produced media asset from a live playout and production system,
wherein the live playout and production system is synchronized to a reference clock;
convert a normalized event metadata from a play time of pre-produced media asset metadata to a reference time of the reference clock based on at least a plurality of play events from the live playout and production system,
wherein the plurality of play events exist for the pre-produced media asset as multiple start and stop times for the pre-produced media asset to support inclusion of non-programming content and restart the pre-produced media asset during a playout; and
transmit start and end messages for publishing the normalized event metadata each time the pre-produced media asset is started and stopped during the playout in a disparate live media output stream,
wherein the normalized event metadata is published by leveraging timestamps to convert the timestamps for one or more key events to the reference time of the reference clock.

2. The system according to claim 1, wherein the processor is further configured to:
create the normalized event metadata for the pre-produced media asset ahead of time and independent of a live event logging system.

3. The system according to claim 1, wherein the processor is further configured to:
generate a programming schedule that includes the one or more key events that occurred from a starting point until a current live point in a live media output stream;
present the one or more key events to a consumer device before the live media output stream with the pre-produced media asset in progress is joined; and
present additional information to the consumer device based on a viewing operation, by an associated user, of the pre-produced media asset contained in the live media output stream.

4. The system according to claim 3, wherein the generated programming schedule further comprises one or more indicators to mark discontinuities between the one or more key events.

5. The system according to claim 3, wherein the reference clock is received and decoded by the consumer device as each media segment of one or more media segments is played back, and
wherein the one or more media segments are associated with the live media output stream.

6. The system according to claim 3, wherein the processor is further configured to:
synchronize the timestamps in the normalized event metadata with the reference clock such that the additional information is synchronized with a timeline of the live media output stream.

7. The system according to claim 3, wherein links to media or data are identified by the consumer device in the normalized event metadata.

8. The system according to claim 7, wherein the media or the data are presented along with other specified data at a correct point in a timeline of the live media output stream.

9. The system according to claim 1, wherein the start and end messages include the timestamps leveraging the reference clock for the one or more key events.

10. A method, comprising:
obtaining, by a processor, a start time and a stop time for a pre-produced media asset from a live playout and production system,
wherein the live playout and production system is synchronized to a reference clock;
converting, by the processor, a normalized event metadata from a play time of pre-produced media asset metadata to a reference time of the reference clock based on at least a plurality of play events from the live playout and production system,
wherein the plurality of play events exist for the pre-produced media asset as multiple start and stop times for the pre-produced media asset to support inclusion of non-programming content and restart the pre-produced media asset during a playout; and
transmitting, by the processor, start and end messages for publishing the normalized event metadata each time the pre-produced media asset is started and stopped during the playout in a disparate live media output stream,
wherein the start and end messages include a timestamp leveraging the reference clock for each key event.

11. The method according to claim 10, further comprising creating, by the processor, the normalized event metadata for the pre-produced media asset ahead of time and independent of a live event logging system.

12. The method according to claim 10, further comprising:
generating, by the processor, a programming schedule that includes one or more key events that occurred from a starting point until a current live point in a live media output stream;
presenting, by the processor, the one or more key events to a consumer device before the live media output stream with the pre-produced media asset in progress is joined; and
presenting additional information to the consumer device based on a viewing operation, by an associated user, of the pre-produced media asset contained in the live media output stream.

13. The method according to claim 12, wherein the generated programming schedule further comprises one or more indicators to mark discontinuities between the one or more key events.

14. The method according to claim 12, wherein the reference clock is received and decoded by the consumer device as each media segment of one or more media segments is played back, and
wherein the one or more media segments are associated with the live media output stream.

15. The method according to claim 12, further comprising synchronizing, by the processor, the timestamp in the normalized event metadata with the reference clock such that the additional information is synchronized with a timeline of the live media output stream.

16. The method according to claim 12, wherein links to media or data are identified by the consumer device in the normalized event metadata.

17. The method according to claim 16, wherein the media or the data are presented along with other specified data at a correct point in a timeline of the live media output stream.

18. A non-transitory computer-readable medium having stored thereon, computer-readable instructions, which when executed by a computer, cause the computer to execute operations, the operations comprising:
obtaining a start time and a stop time for a pre-produced media asset from a live playout and production system,
wherein the live playout and production system is synchronized to a reference clock;
converting a normalized event metadata from a play time of pre-produced media asset metadata to a reference time of the reference clock based on at least a plurality of play events from the live playout and production system,
wherein the plurality of play events exist for the pre-produced media asset as multiple start and stop times for the pre-produced media asset to support inclusion of non-programming content and restart the pre-produced media asset during a playout; and
transmitting start and end messages for publishing the normalized event metadata each time the pre-produced media asset is started and stopped during the playout in a disparate live media output stream,
wherein the normalized event metadata is published by leveraging timestamps to convert the timestamps for one or more key events to the reference time of the reference clock.

* * * * *